United States Patent [19]
Netzer

[11] Patent Number: 5,870,607
[45] Date of Patent: Feb. 9, 1999

[54] METHOD AND APPARATUS FOR SELECTIVE REPLAY OF COMPUTER PROGRAMS

[75] Inventor: Robert Netzer, Scituate, R.I.

[73] Assignee: Brown University Research Foundation, Providence, R.I.

[21] Appl. No.: 710,098

[22] Filed: Sep. 11, 1996

[51] Int. Cl.[6] .................................................. G06F 9/45
[52] U.S. Cl. ..................... 395/704; 395/709; 395/183.14
[58] Field of Search .................................. 395/704, 709, 395/183.14, 183.11, 183.1, 183.09, 701

[56] References Cited

U.S. PATENT DOCUMENTS

| | | | |
|---|---|---|---|
| 5,218,525 | 6/1993 | Amasaki et al. | 364/140.09 |
| 5,230,050 | 7/1993 | Iitsuka et al. | 395/707 |
| 5,335,344 | 8/1994 | Hastings | 395/183.11 |
| 5,410,685 | 4/1995 | Banda et al. | 395/183.14 |
| 5,539,907 | 7/1996 | Srivastava | 395/709 |
| 5,732,273 | 3/1998 | Srivastava et al. | 395/704 |
| 5,787,285 | 7/1998 | Lanning | 395/704 |

OTHER PUBLICATIONS

Tracing of User Programs for Incremental Replay; Michael W. Shapiro; Senior Honors Thesis for Computer Science 193, 194; Apr. 7, 1996; pp. 1–20.

Optimal Tracing and Incremental Reexecution for Debugging Long–Running Programs; Robert H.B. Netzer, et al.; SIGPLAN Conference on Programing Language–Design & Implementation; Jun. 1994; pp. 1–13.

*Primary Examiner*—James P. Trammell
*Assistant Examiner*—Demetra R. Smith
*Attorney, Agent, or Firm*—Wolf, Greenfield & Sacks, P.C.

[57] ABSTRACT

A user can selectively replay portions of a computer program execution, so that the entire program need not be run again to support further test and debug. A run-time instrumented version of the program is created by inserting special instructions into the original program. The run-time instrumented version is executed to create trace files of memory accesses and system calls, as well as identification of interrupts. During execution of the run-time instrumented version, a state of each accessed memory location is monitored and updated to determine which memory accesses should be traced and when. This monitoring and updating is performed in a manner which minimizes interference with the execution. A user then may select a desired portion of the original computer program for replay and, in response, appropriate data is stored in corresponding memory locations so that the desired portion of the program may be replayed accurately.

18 Claims, 22 Drawing Sheets

| REGISTER NAME | USE |
|---|---|
| %g1 | UNUSED BY HOOKS |
| %g2 | TEMPORARY FOR STATE COMPUTATIONS |
| %g3 | TEMPORARY FOR ADDRESS CALCULATIONS |
| %g4 | STORE CONSTANT VALUE 0x80000000 |
| %g5 | TEMPORARY FOR STATE COMPUTATIONS |
| %g6 | UNUSED BY HOOKS |
| %g7 | SOFTWARE INSTRUCTION COUNTER |

Fig. 23

| ORIGINAL INSTRUCTION | INSTRUMENTED CODE | COMMENTS |
|---|---|---|
| ld [%rY], %rX | stb %g0, [%rY+%g4]<br>ld [%rY], %rX | set R bit to 0<br>original full-word read |
| ldub [%rY], %rX | andn %rY, 0x3, %g5<br>stb %g0, [%g5+%g4]<br>ldub [%rY], %rX | word-align address<br>set R bit to 0<br>original partial-word read |
| st %rX, [%rY] | lduh [%rY+%g4], %g5<br>srl %g5, 4, %g2<br>or %g5, %g2, %g2<br>sth %g2, [%rY+%g4]<br>st %rX, [%rY] | load state half-word<br>right-shift by four bits<br>or with original bits<br>store new state half-word<br>original full-word write |
| stb %rX, [%rY] | lduh [%rY+%g4], %g5<br>or %g5, 0x8, %g5<br>sth %g5, [%rY+%g4]<br>stb %rX, [%rY] | load state half-word<br>set M bit<br>store new state half-word<br>original partial-word write |

Fig. 24

METHOD AND APPARATUS FOR SELECTIVE REPLAY OF COMPUTER PROGRAMS

This invention was made with Government support under Grant No. CCR-9309311 awarded by the National Science Foundation. The Government has certain rights in this invention.

BACKGROUND OF THE INVENTION

1. Field of the Invention

This invention relates generally to a method and apparatus for debugging and testing computer software and, more particularly, to a technique that allows a user to selectively replay portions of a previously executed computer program.

2. Discussion of the Related Art

During the development of a computer program, it often is desirable to test the computer program by providing test data, and then executing the computer program to generate test results. A user then may evaluate the test results and modify the computer program based upon the results. During this process, the user may desire to run at least a portion of the computer program several times to assist, for example, in isolating the suspected cause of an error. When, however, a computer program is very large or has a very long execution time, it may be impractical to replay the entire program for evaluation and debugging. Therefore, a technique called incremental replay was developed which allows a user to select and replay only a portion of the computer program's execution.

To provide effective support for debugging and testing computer programs, a replay apparatus must incur low setup and replay times, it must interfere with and slow down the program's execution as little as possible, and it must not require large amounts of data to be stored. Setup time is the time required to prepare for replay after an original program has been executed at least once. Replay time is the time required to actually re-execute the instructions associated with the desired portion of the computer program. Some approaches minimize setup time while other approaches minimize replay time. During the setup time, variables or memory locations typically are set to values that are accurate for the portion of the computer program that is to be replayed. Typically, this practice includes providing, during or prior to replay, the same values to the memory locations that were present during the initial execution of the program.

Interference with the original (first executed) program often is caused by inserting instrumentation instructions into the original program to facilitate replay. If there are too many of such instrumentation instructions or if such instructions are too intrusive, then the original program may be slowed down too much during the initial execution or during the replay.

Because replay generally involves some storage during an initial execution of a program, as mentioned above, another consideration is the amount of data to be stored. Although enough data should be stored to accurately replay the desired portions of the original program execution, too much stored data will require excess storage resources as well as unnecessary overhead functions to manage the stored data.

One approach to incremental replay is described by Stuart I. Feldman and Channing B. Brown in, "IGOR: A System for Program Debugging via Reversible Execution", *Proceedings of the SIGPLAN/SIGOPS Workshop on Parallel and Distributed Debugging*, Madison Wis. (May 1988). The IGOR system described uses a virtual memory system of a computer to periodically trace, at fixed time intervals, the pages of the virtual memory system that were modified by a computer program since a previous checkpoint of the computer program. The term "trace," as used herein, refers to storing data in a memory so that such data is available for later use such as resetting variables and memory locations. To restart the program's execution from an intermediate point requires that a replay tool search the stored trace to find the most recent trace of each page. Because checkpoints are taken at fixed time intervals, the IGOR system bounds replay time, i.e. the amount of time required to replay up to a desired portion of the original program execution. However, setting up the state for the replay may require searching through an entire trace file, which may involve significant time and resources. Although this approach is adaptive in that it traces only pages that have been recently written to, tracing the entire contents of pages that have been written to since the last checkpoint can require large amounts of storage.

Another approach to tracing is described by Barton P. Miller and Jong-Deok Choi in, "A Mechanism for Efficient Debugging of Parallel Programs," *SIGPLAN Conference on Programming Language Design and Implementation*, Atlanta Ga., (June 1988). With such a Parallel Program Debugger (PPD) as described in this and other publications, an analysis is performed at compile-time of a program to determine what and when to trace. In particular, the PPD writes a prelog on the entry of each procedure, with the prelog containing the values of the variables that the procedure might possibly read. The prelog allows a procedure to be replayed alone since the prelog contains all variables necessary for the instructions of the procedure to properly execute. A postlog is written upon exit from the procedure, with the postlog containing the values of the variables that the procedure might have modified. The postlog allows the procedure to be skipped during replay since the postlog includes changes that the procedure might make.

A system such as PPD may result in storing much more data than is actually required to facilitate replay, because the analysis performed at compile-time must be conservative to assure that any replay will be accurate. Additionally, tracing only at procedure entry and exit may incur a large amount of intrusion during the initial execution of the program, and does not guarantee that replay up to a desired portion of the execution will be attainable in a predetermined amount of time. For example, a loop that is iterated several times and includes a procedure call may result in many needless traces. Conversely, a very long procedure call may not be traced often enough to replay any part of the procedure within time constraints that are acceptable to a user.

Another system, referred to as Spyder, is described by Hiralal Agrawal, Richard A DeMillo, and Eugene H. Spafford in, "An Execution-Backtracking Approach to Debugging," i IEEE Software, pp. 21–26 (May 1991). The Spyder system traces a "change set" before each statement or group of statements. The change set includes the values of the variables which might be modified by the statement or group of statements. A debugger then can backup execution over a statement by restoring the state from the associated change set. To bound the trace size, it is possible to store only the most recent change set for each statement. The Spyder system statically computes the change sets, and for programs that use pointers and arrays, the system must trace each such access. The Spyder system does not bound the time required to perform a replay, since it requires backing up to an instruction that is prior to the desired interval, and then progressing forward to perform the desired interval. A system such as Spyder also is limited by its static nature, in that it may have to trace every array or pointer reference for example.

A technique referred to as Demonic Memory is described by Paul Wilson and Thomas G. Hoher in, "Demonic Memory for Process Histories," *Process of the SIGPLAN '89 PLDI Conference*, pp. 330–343 (June 1989). Such a technique maintains a hierarchy of checkpoints, each checkpoint taken at successively larger time granularities, so that recent states can be reproduced relatively quickly while older states incur more delay. The Demonic Memory technique also includes a virtual snapshot as an approach to checkpointing, in which only the elements of a checkpoint that differ from a previous checkpoint are saved.

Previous techniques for checkpointing and replay are limited by their static nature, in that decisions are made at compile-time regarding what to trace, when to trace, or both. As a result, such techniques often trace more that what is necessary, and may also incur significant delays in replaying a desired portion of the computer program. It would be desirable to provide an approach that adaptively determines what information to trace and when to trace such information, and which minimizes interference with the computer program. It also would be desirable to allow a user to determine the amount of delay time to be incurred prior to a replay.

SUMMARY OF THE INVENTION

An aspect of the invention allows a user to selectively replay portions of the execution of an original computer program, so that the program need not be run again from the start to support further testing and debugging. A run-time instrumented version of the program is created by inserting special instructions into the original program. The run-time instrumented version is executed to create trace files of memory accesses and system calls, as well as identification of interrupts. During execution of the run-time instrumented version, a state of each accessed memory location is monitored and updated to determine which memory accesses should be traced and when. This monitoring and updating is performed in a manner which minimizes trace size and interference with the execution. A user then may select a desired portion of the original execution for replay, and, in response, appropriate data is retrieved from the trace files and stored in corresponding memory locations so that the desired portion of the program may be replayed accurately.

An embodiment of the invention is directed to a method for monitoring an execution of a computer program so that a portion of the execution may be replayed, the method comprising the steps: of segmenting the program execution into a plurality of time, executing the computer program including the plurality of segments, monitoring the program's access to memory to determine for a memory location whether the accessed value of that memory location is a value to be stored, and at an end of each of the plurality of segments executed during execution, storing the accessed value when the previous step determines that the accessed value includes a value to be stored.

Another embodiment of the invention is directed to an apparatus for monitoring an execution of a computer program so that a portion of the computer program may be replayed, the apparatus comprising means for segmenting the computer program into a plurality of segments, means for executing the computer program including the plurality of segments, means for monitoring access of a memory location by, during execution of the computer program to determine whether an accessed value of the memory location includes a value to be stored, and means for storing the accessed value in response to the means for monitoring determining that the accessed value includes a value to be stored, at an end of each of the plurality of segments.

Yet another embodiment is directed to a software debug controller for monitoring an execution of an original computer program so that a portion of the execution may be replayed, the software debug controller comprising an instrumentor having an input that receives the original computer program and a window size definition, and an output that provides a run-time instrumented program that includes the original computer program, memory state control instrumentation that determines whether an accessed value of a memory location includes a value to be stored, and window boundary control instrumentation that stores the accessed values in response to the memory state control instrumentation at an end of each of a plurality of segments defined by the window size definition.

In any of the above embodiments, an input may indicate a selected one of the plurality of segments of the computer program to be replayed, with the replay effected by restoring into memory the memory locations traced for the interval during the original program execution.

Additionally, a state may be associated with each memory location, either in addition to the state required to effect the tracing described above, or state for another purpose. The type of access of the memory location then may be monitored to determine whether such access is one of a predetermined plurality of access types, so that the state may be modified depending upon the type of access. The predetermined plurality of access types may include a read, a write, a write made during a system call, a branch, or any other action performed by a computer program. The state also may be transitioned from a first state to a second state without performing a conditional test on the first state. In one embodiment, a state variable is stored in a second memory location that has a predetermined offset from the memory location.

Further, the type of access of the memory location may be monitored to determine whether the access corresponds to a predetermined type of memory access, and if the access does correspond, an accessed value of the memory location may be stored prior to an end of one of the plurality of segments. In one embodiment, the type of access is a system call that modifies data stored in the memory location.

BRIEF DESCRIPTION OF THE DRAWINGS

Other features and advantages of the present invention shall appear from the following description of exemplary embodiments, said description being made with reference to the appended drawings, of which:

FIG. 23 is a diagram that illustrates definitions of global registers used during the instrumentation phase for an embodiment of the invention that may be executed on a SPARC workstation; and FIG. 24 is a diagram that illustrates instrumentation inserted into an original computer program for an embodiment of the invention that may be executed on a SPARC workstation, using the global registers as defined in FIG. 23.

DETAILED DESCRIPTION

An embodiment of the invention involves identifying memory accesses by a computer program to be traced to support replay of a portion of an execution of a computer program. Instrumentation then may be provided to trace only the necessary memory accesses, and to avoid storing unnecessary memory accesses. Accordingly, the following includes a high level description of a computer system and associated processes, followed by an explanation of the concepts that assist in understanding the invention, and a more detailed description of embodiments of the invention.

Figure 1:
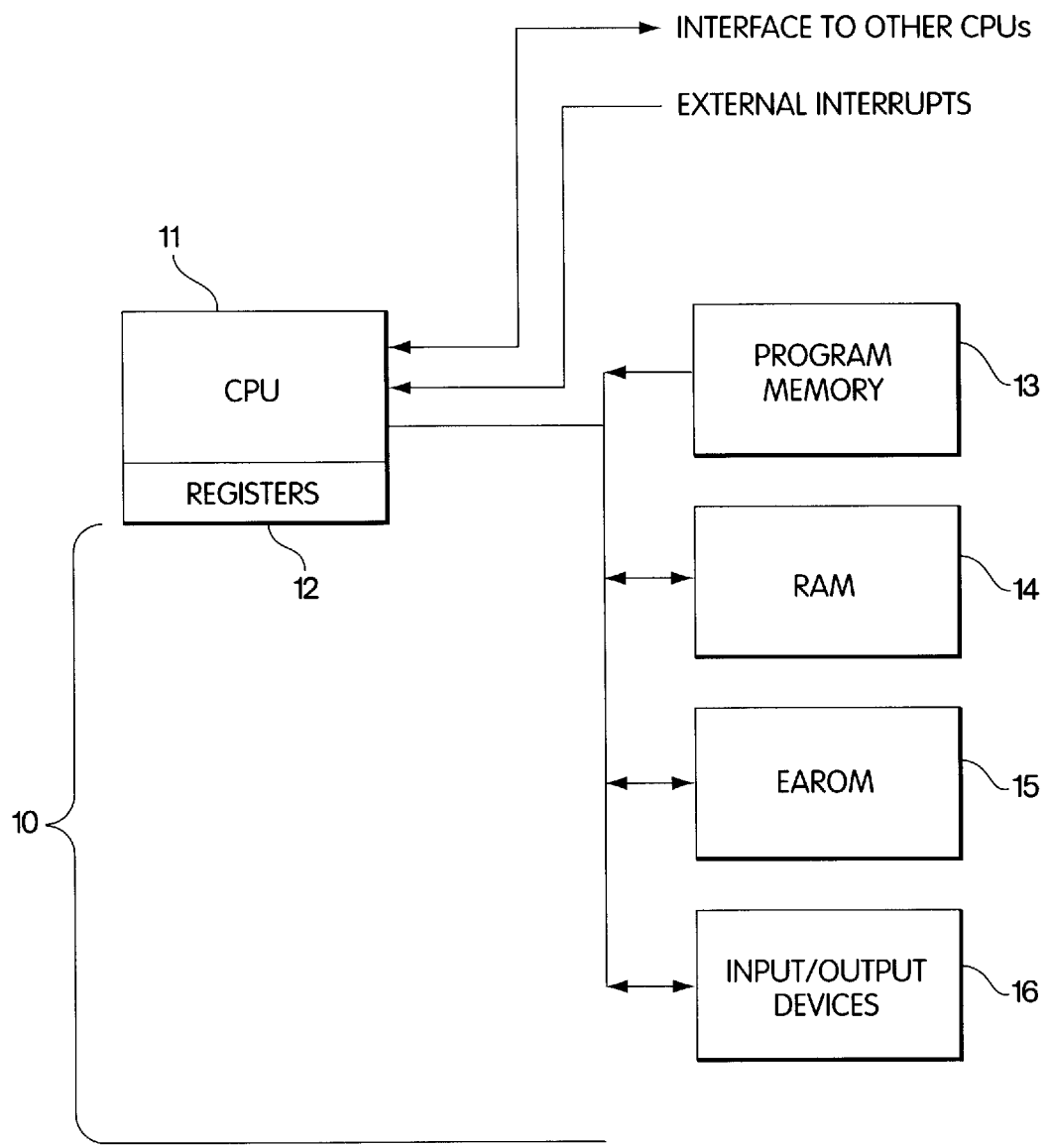
FIG. 1 is a block diagram illustrating the electronic hardware components of a computer system.

FIG. 1 is a block diagram illustrating the electronic hardware components of a computer system 10. FIG. 1 shows a core processing unit (CPU) 11 which may also include registers 12. Such registers typically are internal to the CPU 11, and provide quick access to data that is temporarily stored by the CPU 11. Such a CPU 11 typically is coupled to program memory 13 via computer bus 18. The program memory 13 commonly includes Read Only Memory (ROM) and contains the data including instructions for execution by the CPU 11. The CPU 11 also may be connected to Random Access Memory (RAM) 14, which typically is volatile memory used to store temporary data. Electrically Alterable Read Only Memory (EAROM) 15 also may be connected to the CPU 11, which provides non-volatile data that may also be modified. Such an EAROM may be used to store instructions or other data desired to be retained even during a power down of the computer system 10.

As shown in FIG. 1, the CPU 11 also interfaces with input/output devices 16, which can include printers, displays, keyboards, mouses, and/or other elements generally referred to as sensors and effectors. The computer system 10 also may include an interface to other CPUs, via shared memory or first-in first-out (FIFO) memory, for examples. Additionally, external interrupts also may be received by the CPU 11.

Each of the arrows in FIG. 1 designates a potential data flow to or from the CPU 11. To assure accurate replay, it is desirable to emulate accurately any data flow necessary to recreate a particular state of the CPU 11, so that a portion of a computer program execution associated with that particular state may be replayed.

Figure 2:
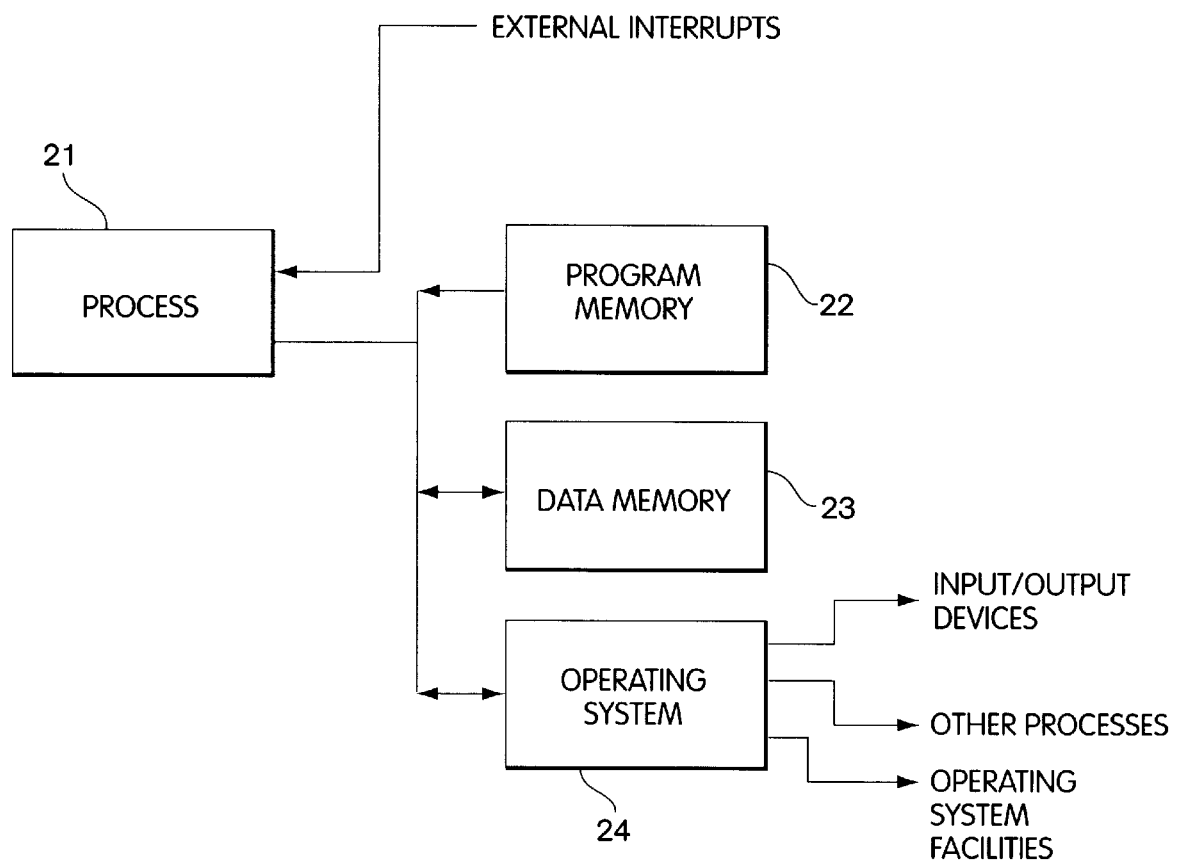
FIG. 2 is a block diagram illustrating interrelated processes and memory devices of a computer system.

FIG. 2 is a block diagram of the same computer system 10 showing the interrelated processes thereof. A process 21 may be viewed as having interfaces to program memory 22, data memory 23, and the operating system 24 (via system calls). Typically the system calls provide an interface by which the process 21 may communicate with input/output devices, other processes, and the operating system for the CPU on which the process executes. The process 21 also is responsive to external interrupts. As with FIG. 1, the arrows designate potential data flow from a process perspective.

To reduce setup time and replay time for a computer program, the execution of a computer program may be segmented into a plurality of windows. Each window may be described by a given amount of execution time, a given number of instructions executed, a given portion of the program, or by any other means that specifies a contiguous portion of the program execution as specified by the user. For example, if a computer program having a total execution time of ten hours is segmented into a plurality of five-minute windows, then a user will be able to replay up to any portion of the program execution within five minutes of having setup for the replay of the appropriate window.

In accordance with an embodiment of the invention, a user may designate a window size "T" as a time value such as, for example, five minutes. In general, however, the window size may be specified with any means that describes a portion of the execution, such as in the number of instructions executed per window, the number of subroutines per window, etc., or a range of such values which are allowable. Additionally, a user may designate a quantity "M" of windows that are allowed to be setup prior to the setup of a desired window which is to be replayed. For example, if a user designates a window size T of five minutes and a replay window quantity M of two, then the replay time for any window will be at most five minutes, and the setup for such a replay requires setting up the previous two windows in addition to the requested window.

Figure 3:
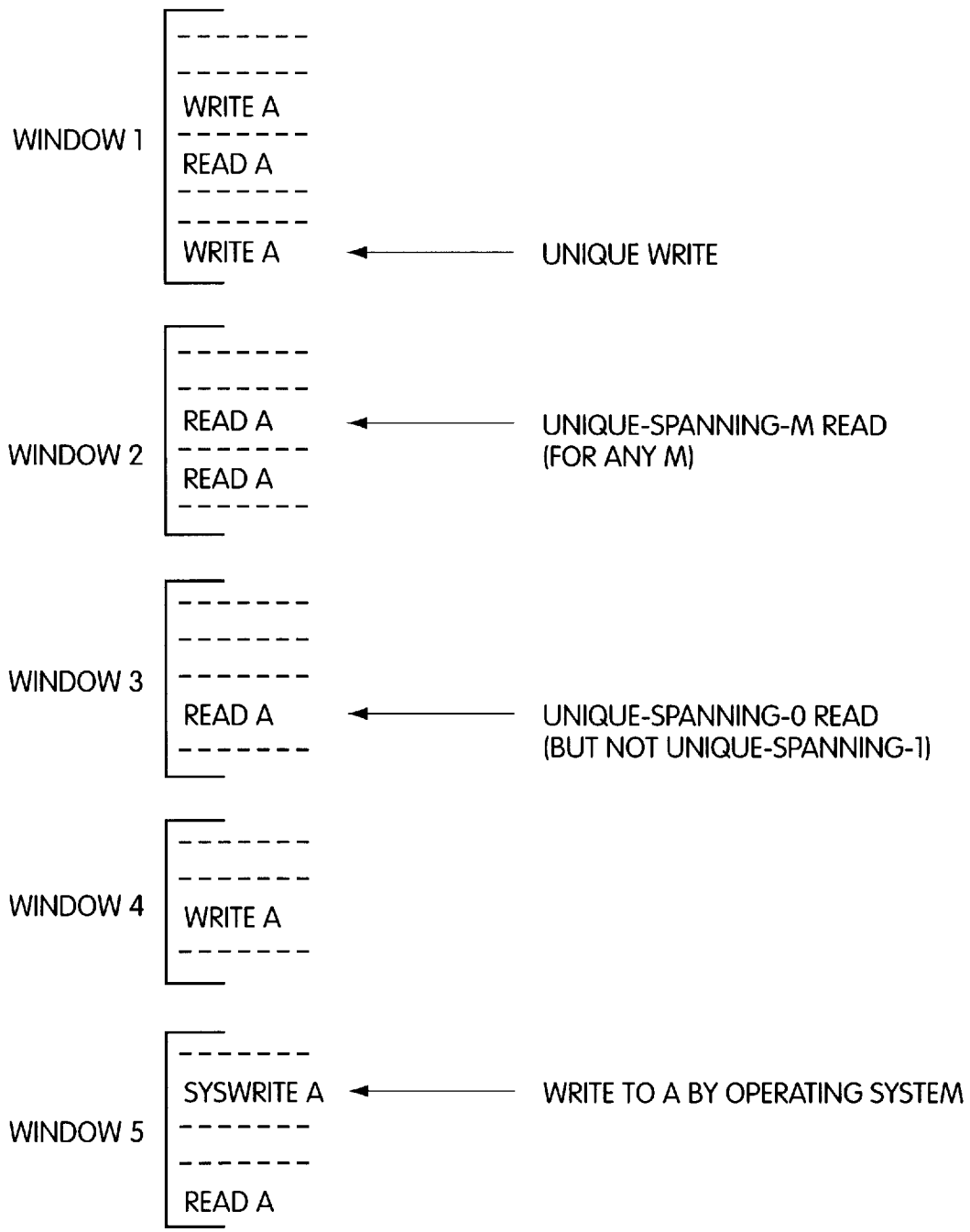
FIG. 3 is a diagram that depicts a sequence of memory or variable accesses performed by a computer program, the sequence being divided into a plurality of time interval windows.

It is generally undesirable to simply store during an initial execution all data being operated upon (i.e., the data values being read or being written) by the program execution at the beginning of each window, because such an approach would result in storing much more data than is actually necessary to accurately replay each window. Such an approach also would likely cause interference with the original computer program because of the time and resources which would be required during an initial execution of the computer program to store all of the associated data. However, certain memory accesses performed by the computer represent data should be traced for accurate replay. Such memory accesses may be referred to as "unique-spanning" reads. For example, FIG. 3 illustrates a sequence of memory accesses performed by a computer program, including read and write operations. Although many of the concepts herein are described with respect to memory accesses at the computer hardware level, many advantages of the invention may be achieved also by monitoring variable accesses at a software level. The monitoring of variable accesses, however, may be more intrusive in some circumstances than monitoring particular memory locations, because a variable may reside at different locations during different portions of a computer program, so that additional software is required to monitor such locations.

In FIG. 3, a sequence of instructions in a computer program is segmented into five windows or segments, shown in FIG. 3 as windows 1–5. FIG. 3 also shows memory accesses made to a single memory location ("memory location A"). The accesses are performed within each of the five windows. These memory accesses may be interspersed among other instructions. During the sequence of instructions in window 1, the first access to memory location A is a write. To accurately replay window 1 with respect to memory location A, it is irrelevant what value is stored in memory location A just prior to such replay, because regardless of what value is stored, the original value (i.e. the value during the original execution of the computer program) will be restored during the first write of window 1 during a replay.

Generally, if a first memory access to a particular location in a particular window is a read, then it will be necessary to store the value that was read during the initial execution to support replay. Such reads are called "unique-spanning reads". If, however, the replay window quantity M has been defined to be one or more, then it may not be necessary to store the value read if it is confirmed that one of the prior M windows contained a unique-spanning read of the same location, the value of that read was stored, and no write to that location has occurred since the unique-spanning read in the prior window. A read whose value must be stored because it does not meet these conditions is referred to as unique-spanning-M. A "unique-spanning" read is shorthand for "unique-spanning-0". For example, in FIG. 3 the first access in Window 3 to memory location A is a unique-spanning read. However, if M=1, the value read need not be stored since it is stored within the last M windows, in this case Window 2. In response to a request to replay Window 3, if Window 2 is setup first (but not replayed), then after Window 3 is setup the value of location A required by the replay of Window 3 will be correctly setup. Therefore, the read in Window 3 is not unique-spanning-1, but it is unique-spanning-0. As another example, the first read in Window 2 is unique-spanning-M for any value of M. Because of the write to location A near the end of the prior window, the value of location A read in Window 2 must be stored, as the write may place in location A a new value. Note that Window 4 contains only a write to memory location A. Accordingly, it is not necessary to store any data associated with the replay of window 4. In addition, the value of M chosen can be larger than the total number of windows in the execution. In such a case, a unique-spanning-M read is then a read of a memory location A that is not previously written in the same window, or traced in any prior window in the execution. Such reads can be specially designated as "unique-spanning-infinity" to indicate that the value of M is larger than the total number of windows.

Window 5 includes a system write (SYSWRITE A), indicative of a second process (i.e., not the process being monitored or replayed) that writes to memory location A. Such a situation may be the result of a system call, or any such memory access performed by a second process. Typically, a system call provides a predetermined function that is part of the operating system and is made available to a computer programmer. The programmer creates an instruction that includes a system call, and the operating system modifies one or more designated memory locations as a result of the system call. An example of such a system call is a call to read a line of text from a file stored on a disk drive. Instead of a computer programmer re-creating an algorithm to manipulate the disk drive hardware, the programmer instead provides an instruction that provides a system call along with the input variable, and possibly the output memory location. In certain circumstances, the output location may be predetermined. System calls are also used to interface with other peripherals and processes, and to retrieve information from the operating system such as the time of day.

Because system calls often access data from the environment external to a process (such as data on a disk file), it is often desirable to skip over the system calls in a window during replay. Skipping over system calls allows a window to be accurately reproduced without first requiring the external environment to be restored to the state it was in during the initial execution. To accomplish this, enough data must be stored so that the changes to the state made by a system call can be reproduced during a replay when the call is skipped over. There are two approaches. First, all the memory locations that a system call might potentially write to can be stored at the time of the system call. These values can then be restored into their respective memory locations when the call is reached (and then skipped over) during a replay. Second, instead of tracing the values potentially written by the system call, the values of the memory locations potentially written can be stored only if they are subsequently read within the window (if they are read in a later window, the reads are treated as a ordinary reads and are traced as described above). These values can then be restored into their respective memory locations when the call is reached (and then skipped over) during a replay.

An alternative to storing unique-spanning-M reads to support replay is to store writes, or to store a combination of reads and writes. For example, the last write in window 1 is referred to as a unique write, because to support replay from only write data, this write must be stored. A drawback, however, to segmented replay based upon writes is that no arbitrarily small bound can be placed on the time required to setup for a replay request unless all previous windows are also replayed. This is the case because it will not be known prior to replay which memory locations will be read by instructions that are associated with a window. Therefore, to setup for a replay of a desired window, the memory locations modified by all previous windows must be restored, and the number of such windows grows with the length of the execution.

Figure 4:
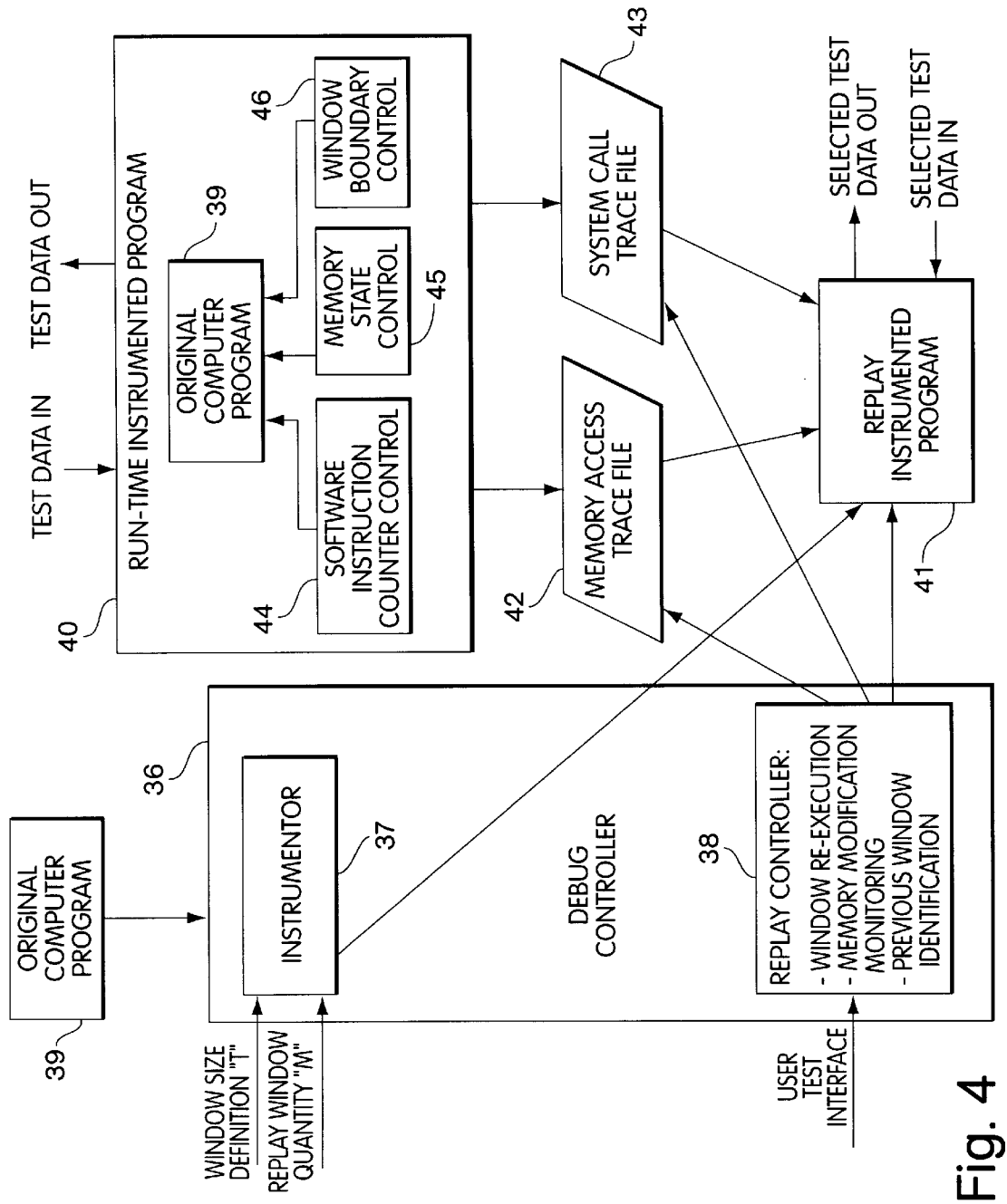
FIG. 4 is a block diagram of an embodiment of the invention, in which a debug controller interfaces with an original computer program to facilitate replay of selected windows of the original computer program.

FIG. 4 is a block diagram of an embodiment of the invention, which makes use of the concepts described above to facilitate replay of selected windows of an initial execution of a computer program. FIG. 4 shows a debug controller 36 that includes an instrumentor 37 and a replay controller 38. The instrumentor 37 interfaces with the original computer program 39, as well as with a user to determine window size T definition and a replay window quantity M definition. Such window size T definition and replay window quantity M definition may also be predetermined, for example, as default values.

A run-time instrumented program 40, created by the instrumentor 37, includes the original computer program 39 as well as software instruction counter control 44, memory state control 45, and window boundary control 46. The run-time instrumented program 40 may also interface with test data in, and provide test data out when the run-time instrumented program 40 is executed.

In one embodiment, the run-time instrumented program 40 creates a memory access trace file 42 and a system call trace file 43, each of which may be used by a replay instrumented program 41 to facilitate replay of selected portions of the initial execution of the computer program. The replay controller 38 interfaces with the replay instrumented program 41, to support user test functions such as window replay, memory modification monitoring, and previous window identification. The debug controller 36 may also include or interface with known debug support tools.

Figure 5:
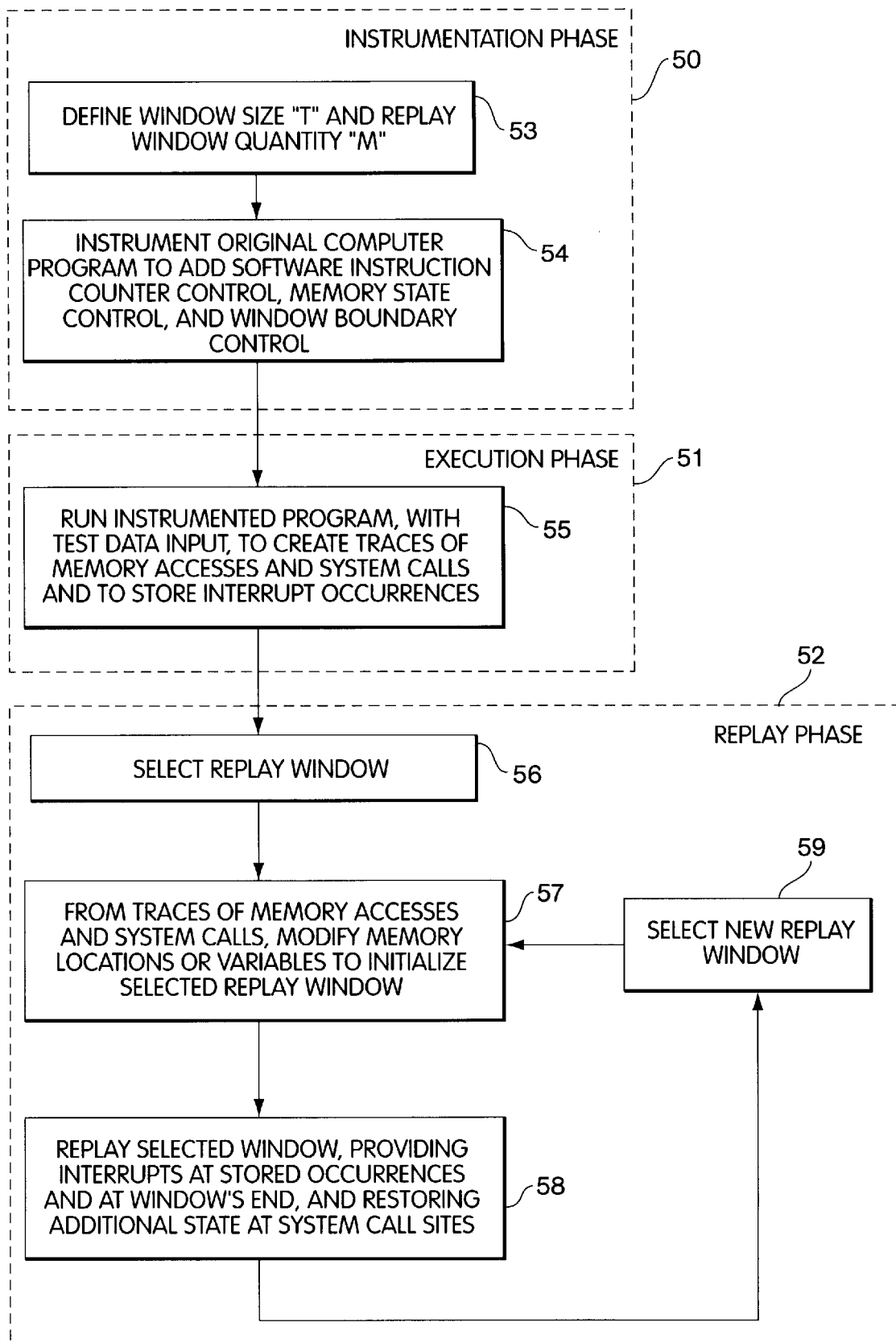
FIG. 5 is a flow diagram showing the process performed by an embodiment of the invention, such as the embodiment of FIG. 4.

FIG. 5 is a flow diagram showing a process performed by an embodiment of the invention. The process will be described with respect to elements of the embodiment of FIG. 4. Generally, the process includes an instrumentation phase 50, followed by an execution phase 51 and a replay phase 52. It should be noted that both the instrumentation phase 50 and execution phase 51 may be controlled in a manner that is transparent to the user, so that users only need be aware of the process if they desire incremental replay. The instrumentation phase 50 includes steps 53 and 54. In step 53, the window size and replay window quantity are defined. In this step, a user may specify window size T in time such as a number of hours, minutes and/or seconds, or using other measures that describe portions of an execution as mentioned earlier. Additionally, the replay window quantity M may be set to any integer. As discussed above, these values may instead be predetermined or stored as default values.

In step 54, instrumentation is added to the original computer program to add software instruction counter control 44, memory state control 45, and window boundary control 46. The software instruction counter control 44 includes instructions added to the original computer program 39 to monitor the execution of the original computer program 39 and to count the number of backward branches and subroutine calls. Backward branches may include direct branches to instructions that were previously executed, or procedure calls which might possibly include a branch to previously executed instructions. This information may be used during the execution phase 51 to uniquely identify an instruction that was being executed when an interrupt occurred, so that the interrupt may be recreated accurately during the replay phase 52.

In particular, from an identification of the instruction (such as its address) that was being executed during execution phase 51 when an interrupt occurred, and from an identification of the value of the software instruction counter at the time that the interrupt occurred, the interrupt may be accurately recreated so that during the replay phase 52 the interrupt is presented at a time that is consistent with the time that the interrupt occurred during the execution phase 51. Such use of a software instruction counter is described in more detail by J. M. Mellor-Crummey and T. J. LeBlanc, "A Software Instruction Counter," Proceedings of the Third ASPLOS, April 1989, which is hereby incorporated by reference herein.

Memory state control 45 includes instructions inserted into the original computer program 39, which are performed during execution phase 51 to facilitate monitoring of memory accesses performed during execution of the run-time instrumented program 40, to determine which memory accesses involve data that should be stored. Window boundary control 46 includes instructions to be executed at each window boundary, during the execution phase 51, to facilitate the storage of the data associated with the selected memory accesses. The execution phase 51 includes step 55, in which the run-time instrumented program 40 is executed. The user may provide test data in to the run-time instrumented program 40 and, as a result, test data out may be generated. Examples of test data in are user actions such as keyboard entry, real-time or emulated sensor data, and data stored in existing files. During execution, the run-time instrumented program 40 creates traces of memory accesses and system calls, and stores data relating to interrupt occurrences. In one embodiment, such data is stored in the memory access trace file 42 and the system call trace file 43. Alternatively, such data may be stored in a single file, or in any known technique for storing such data.

The replay phase 52 includes steps 56–59. During step 56, a user or another application program may select a replay window, for example, a window of the initial execution of the computer program 39 that contains instructions which are suspected of containing an error or relating to an error. From the traces of the memory accesses and the system calls, appropriate memory locations or variables are modified in step 57 to setup for the replay window that was selected in step 56.

In step 58, the selected window is replayed, with interrupts provided at the occurrences previously identified from the value of the software instruction counter and the instruction being executed when the interrupt occurred. An interrupt is also simulated at the window's end as a way for the replay controller 38 to regain control after the replay is finished. In step 59, a new window may be selected, to cause steps 58 and 59 to be performed again.

Figure 6:
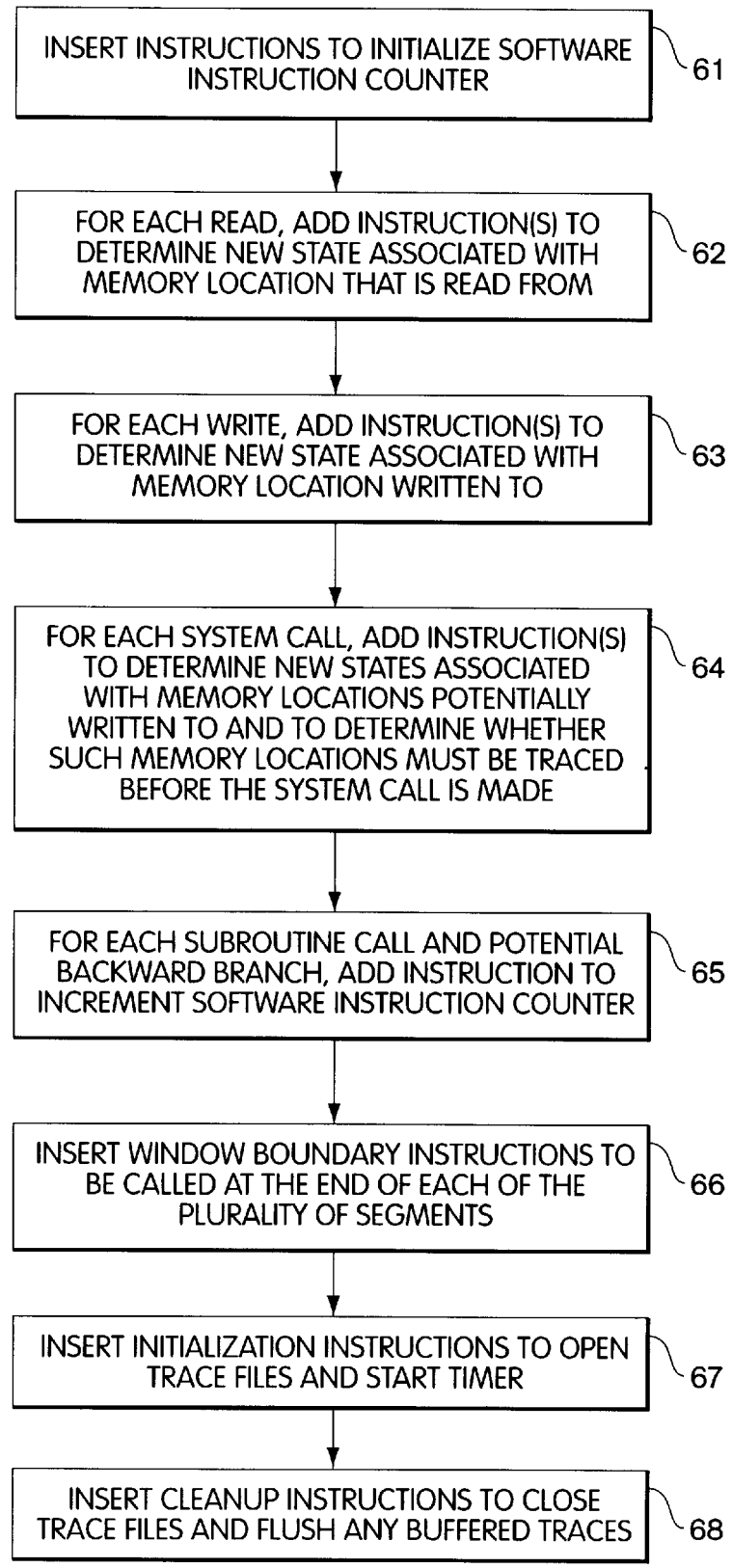
FIG. 6 is a flow diagram of an exemplary instrumentation phase of the process depicted in FIG. 5.

FIG. 6 is a flow diagram showing a more detailed embodiment of the instrumentation phase 50. Phase 50 begins with an initialization of the software instruction counter, as shown in step 61. During step 62, one or more instructions are added to the original computer program 39 for each read to determine a new state associated with the memory location from which data is read. Such instruction may include several actual instructions or a single instruction, and may be referred to as a "hook" because it results in other functions being performed. For example, for the sequence shown in FIG. 3, instructions would be added to the original computer program for each occurrence of the instruction "READ A". These instructions control a state that is associated with memory location A, so that it may be determined during the execution phase which data associated with this memory location is required to be stored to support incremental replay.

In step 63, one or more instructions are added for each write in the original computer program, to determine whether the state associated with the memory location written to should be changed. Thus, steps 62 and 63, the state associated with a memory location may be changed as a result of a read or a write.

In step 64, one or more instructions are added for each system call, to determine new states associated with memory locations potentially written to as a result of the system call, and to determine whether any of these memory locations should be traced prior to the system call being invoked.

The software instruction counter is incremented for each subroutine call and potential backward branch in step 65. In step 66, window boundary instructions are inserted, to be called at each passage of a predetermined time interval. This predetermined time interval corresponds to the window size T that was defined in step 53 of FIG. 5. Examples of window boundary instructions will be described in more detail below.

In step 67, initialization instructions are inserted into the original computer program 39, such as instructions to open trace files and start a timer. Cleanup instructions such as instructions to close trace files and flush any buffered traces are inserted in step 68. It may be desirable to flush buffered traces when the original computer program 39 crashes during the execution phase. Following the steps shown in FIG. 6, the execution phase 51 of the process depicted in FIG. 5 may be performed.

Figure 7:
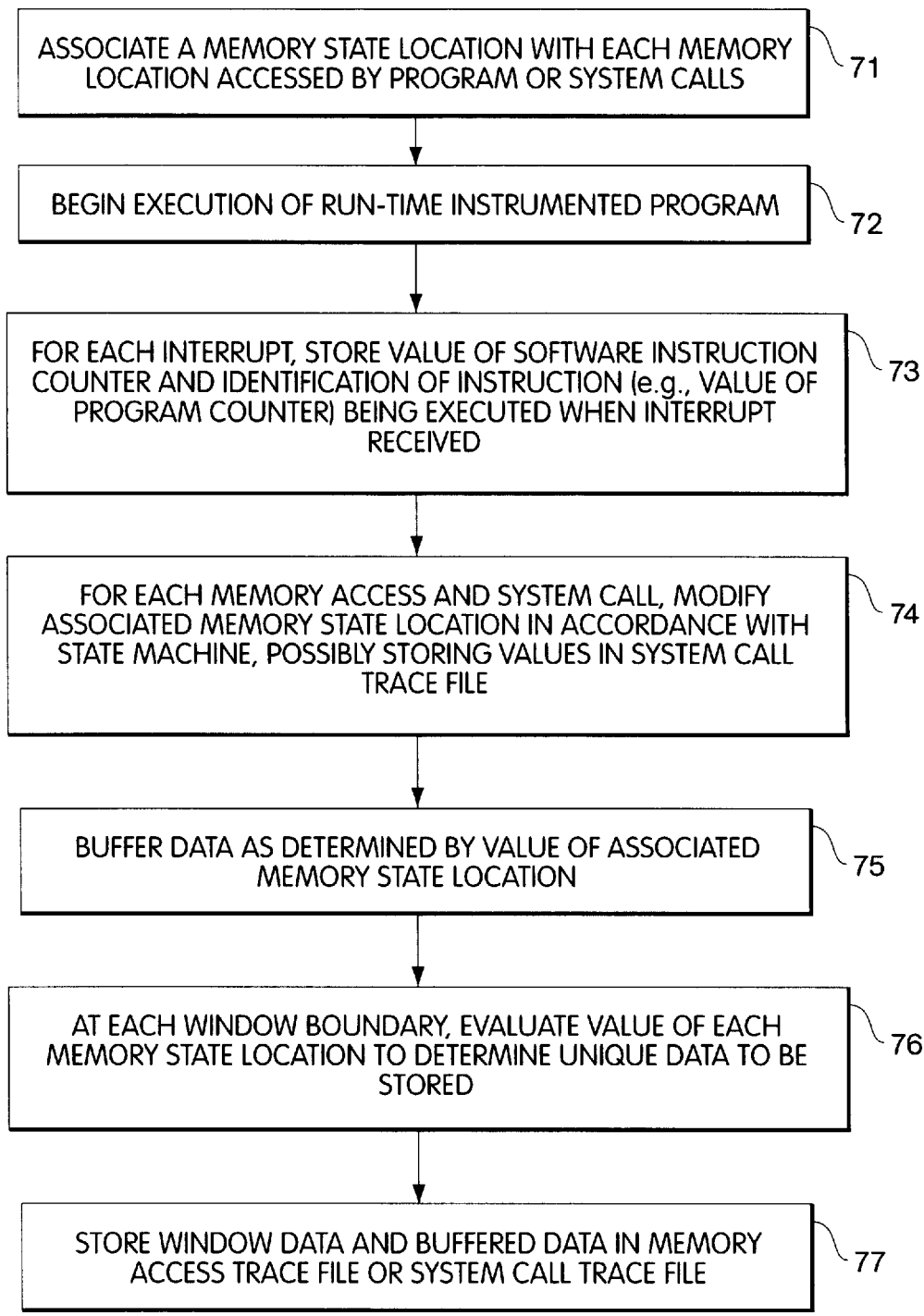
FIG. 7 is a flow diagram of an exemplary execution phase of the process depicted in FIG. 5.

A flow diagram of an embodiment of the execution phase 51 is shown in FIG. 7. As described above with respect to steps 62 and 63, instructions may be added to the original computer program to control states that are associated with memory locations accessed by the original computer program 39. Step 71 shows that in one embodiment, a memory state location may be associated with each memory location that is accessed by the original computer program 39. Such access may include direct access by the original computer program 39, or accesses performed as a result of a system call performed by the program 39.

In one embodiment, a memory state location may be associated with each memory location that is accessed by the computer program 39. Such a memory state location can store an indication of the state of the associated memory location, which may be used to determine whether such data should be stored during the execution phase 51 to support replay. In one embodiment, the memory state location is a memory location having a particular offset from the memory location being monitored. For example, if memory location address 02560004H (in base hexadecimal representation) is monitored, then a memory state location for that memory location might be 82560004H. Thus, to access the memory state corresponding to the memory location, all that is required during the execution phase is the addition of a single offset to the memory address, and if this offset is a power of two, the addition can be accomplished by setting a single binary bit of the address. Such arrangements may facilitate less interference during the execution phase 51.

In step 72, the execution of the run-time instrumented program 40 is initiated. This execution is monitored so that for each interrupt, a value of the software instruction counter may be stored, along with an identification of the instruction being executed (such as the current value of the CPU's program counter) when the interrupt was received, as shown in step 73.

For each memory access and system call, the associated memory state location then is modified in accordance with a state machine. In some instances, the associated memory state location might not be modified, depending upon the previous state of the associated memory state location. In addition, some system calls may cause traces to be written to the system call trace file. Several embodiments of the invention include a state machine for controlling each associated memory state location, examples of which are described below.

In some instances, it may be desirable to temporarily buffer the value in a memory location, without permanently storing such data. This buffering may be accomplished by the operating system or by one of the hooks, as discussed below. Accordingly, in step 75, some data is buffered, as determined by the value of the associated memory state location. At each window boundary, which represents an end of a particular segment of the initial execution of the computer program 39, the value of each memory location is evaluated to determine the unique data to be stored, as shown in step 76. For example, such evaluation may be performed by window boundary control 46. Then the unique data and appropriate buffered data may be stored, for example in the memory access trace file 42 and the system call trace file 43, as shown in step 77.

Figure 8:
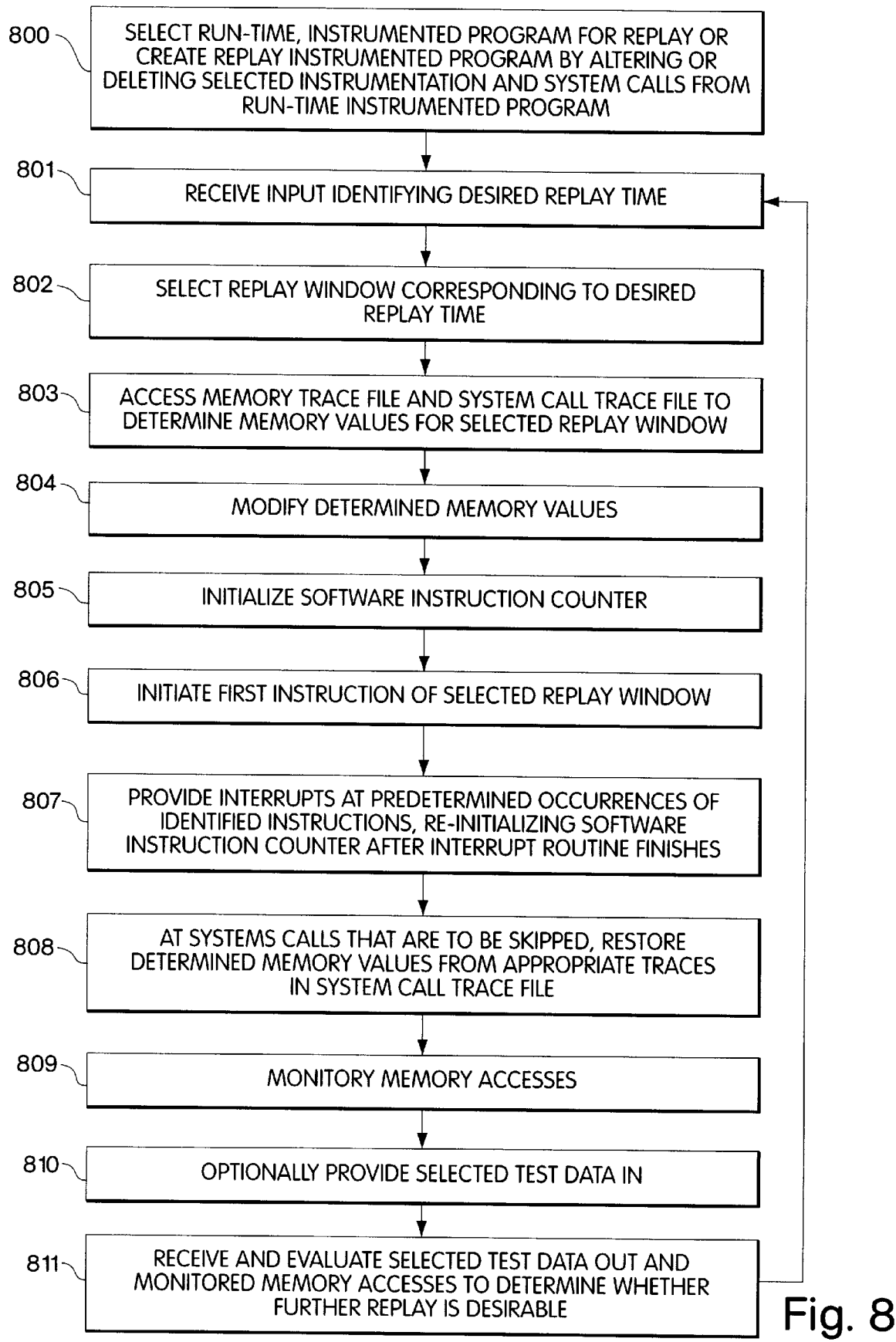
FIG. 8 is a flow diagram of an exemplary replay phase of the process depicted in FIG. 5.

FIG. 8 is a flow diagram of a replay phase 52 of the process depicted in FIG. 5. For the replay phase 52, either the run-time instrumented program 40 may be executed, or a separate replay instrumented program 41 may be executed. It may be desirable to provide a separate replay instrumented program 41, as shown in FIG. 4, because such a program may be provided without some of the instrumentation that was added to the original computer program 39 to create the run-time instrumented program 40. Such a separate replay instrumented program 41 may also include other debug support in place of the original instrumentation.

Accordingly, in step 800 of the relay phase (FIG. 8), the run-time instrumented program 40 is selected for replay, or a replay instrumented program 41 is created by deleting or altering selected instrumentation from the run-time instrumentation program 40. For example, instrumentation added to create the memory access trace file 42 and the system call trace file 43 can be deleted, because it is not necessary again to create such files. Such instrumentation may, however, remain in the computer program to provide additional debug information. Additionally, because system calls may be emulated during replay by providing the results of such system calls (which are stored in the system call trace file 43), system call instructions also can be deleted from the run-time instrumented program. The user then may identify the desired replay time, as shown in step 801. In step 802, a replay window corresponding to the desired replay time is selected.

From the identification of the replay window identified in step 802, the memory trace files are accessed in step 803, to determine the memory locations whose values will be modified to setup for the replay of the selected replay window. In step 804, the values from the memory trace files are written to the memory locations determined in step 803, to partially recreate the state of memory (the values read by the window's unique-spanning-M reads) that was present just previous to the run-time execution of the instructions associated with the selected window. During such replay, when a point is reached at which the initial execution made a system call, the system call trace file is accessed to retrieve the memory values that were originally traced after this system call and before the next (or before the window's end if this is the last system call in the window). This point can easily be identified if the instrumentor 37 replaces each system call in the replay instrumented program 41 with a call back to the replay controller 38. The replay controller can then access the system call trace file and restore the appropriate memory value. The final step before the window's replay is begun is to initialize the software instruction counter (step 805). The trace file is examined to find the first interrupt that occurred during the initial execution of the window to be replayed, and the traced value of the software instruction counter is loaded into the software instruction counter for the replay. The software instruction counter mechanism is also used to identify the window's end so that control may be transferred back to the replay controller 38. Because during the replay the software instruction counter is decremented, loading this value before the window's replay begins facilitates identifying where the interrupt should be reproduced.

In this manner, as described above with reference to FIG. 3, the instructions of the selected window are executed during replay using the same data used during the initial run-time execution of these instructions. The replay time is kept within the time specified by the user, because the user specifies the window size. Moreover, the setup time is also kept within an acceptable limit, because the data that must be retrieved from the trace files all exist together in a specific region of the files. Moreover, the set-up time is minimized, because only data necessary to accurately recreate the initial execution is provided to the appropriate memory locations.

In step 806, the first instruction of the selected replay window is initiated, causing the subsequent instructions also to be executed. If any interrupts had occurred during the run-time execution, corresponding interrupts are provided in step 807 at predetermined occurrences of the identified instructions. As described above, a software instruction counter can be used in conjunction with the interrupted instruction's address to identify where these interrupts should be reproduced. This identification is accomplished by having the replay controller 38 replace each interrupted instruction, and potentially the next few instructions, with instructions that test the value of the software instruction counter and if it equals 0 to jump to the interrupt routine. The address of the interrupt routing is retrieved from the trace information associated with the interrupt. An alternative method is to use an instruction that tests the value of the counter against zero and branches if true, or to use any other method that will determine when the counter has reached zero. After the interrupt routine has been processed, the software instruction counter is re-initialized to provide the next interrupt occurrence.

In step 809, memory accesses may be monitored, so that a user may trace during replay. For example, a user may be replaying a program to determine which instruction causes a faulty value to be written to a particular memory location. The replay controller 38 may provide the capability for tracing selected memory locations, and provide traces to the user. Alternatively, any other type of instrumentation may be added to perform various types of error checking during the replay phase. In general, however, any instrumentation that is caused to be present in the replay instrumented version of the program usually must be of the same size as the instrumentation in the run-time instrumented version of the program. That is, each hook in the replay instrumented version usually should occupy the same number of bytes as the corresponding hook in the run-time instrumented version. This ensures that the relative offsets of subroutines and other data are the same in the replay instrumented version of the program, which may be required for an accurate replay.

To provide test data during the replay phase requires that some system calls be replayed and not skipped over. This functionality would be provided to an advanced user in step 810 by letting them specify which calls to replay and which to skip.

In step 811, additional replay may be selected based upon the evaluation of selected test data provided by the replay, or based upon the monitored memory accesses. If further replay is desired, the process returns to step 801.

Figure 9:
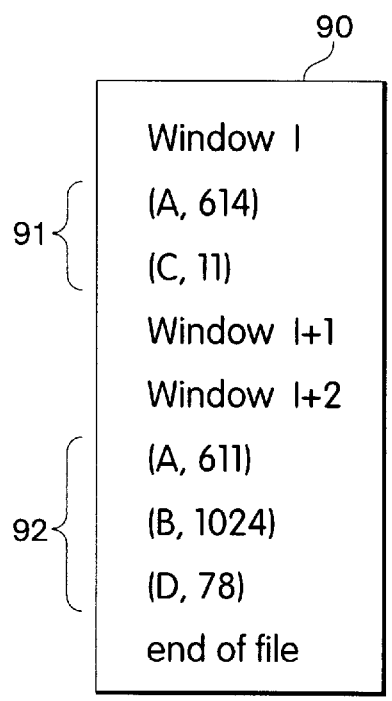
FIG. 9 is a diagram that illustrates an exemplary memory access trace file such as the one shown in FIG. 4.

FIG. 9 illustrates an exemplary memory access trace file such as the one shown in FIG. 4. In this example, M has the value 0, so that to setup for a replay of a window, traces of no prior windows need be examined. As shown in FIG. 9, the memory access trace file 90 may include a list of entries. The first entry, "WINDOW I", identifies that the data 91 following this entry is data required to accurately replay window I. For example, data 91 includes the entry "(A, 614)", indicating that the data value 614 should be written to memory location A prior to replay of window I. Additionally, the entry "(C,11)" indicates that the data value 11 should be written to memory location C prior to replay of window I.

As shown in FIG. 9, window I+1 has no data associated with it. Thus, no data is required to be written prior to replay of window I+1. Window I+2, however, includes the data entries "(A, 611)", "(B, 1024)", and "(D, 78)", indicative of memory location-data value pairs for the replay of window I+2. Other alternative approaches may be used to provide data similar to the data shown in FIG. 9.

Figure 10:
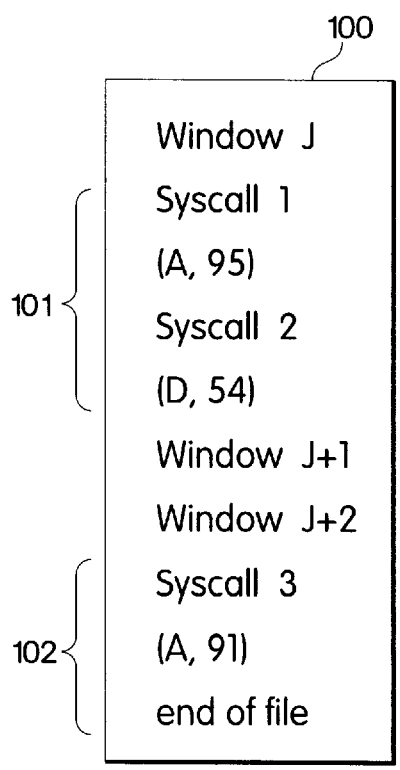
FIG. 10 is a diagram that illustrates an exemplary system call trace file such as the one shown in FIG. 4.

FIG. 10 illustrates an exemplary system call trace file such as that shown in FIG. 4. Such a system call trace file 100 includes (memory location, data value) pairs similar to the memory access trace file 90, but with identifiers for uniquely identifying each system call. For example, as shown in FIG. 10, there were two system calls during the execution of the instructions of window J, in particular "SYSCALL 1" and "SYSCALL 2," as indicated by the data 101. SYSCALL 1 modified memory location A which was traced either at the system call or at a later read of location A (as previously discussed), and SYSCALL 2 modified memory location A which was traced either at the system call or at a later read of location D. Accordingly, during to the replay of window J, the appropriate data values may be written to the corresponding memory locations as previously described. For the example shown in FIG. 10, no system calls were made during window J+1, but one system call "SYSCALL 3" was executed during window J+2, as evidenced by the data 102.

Figure 11:
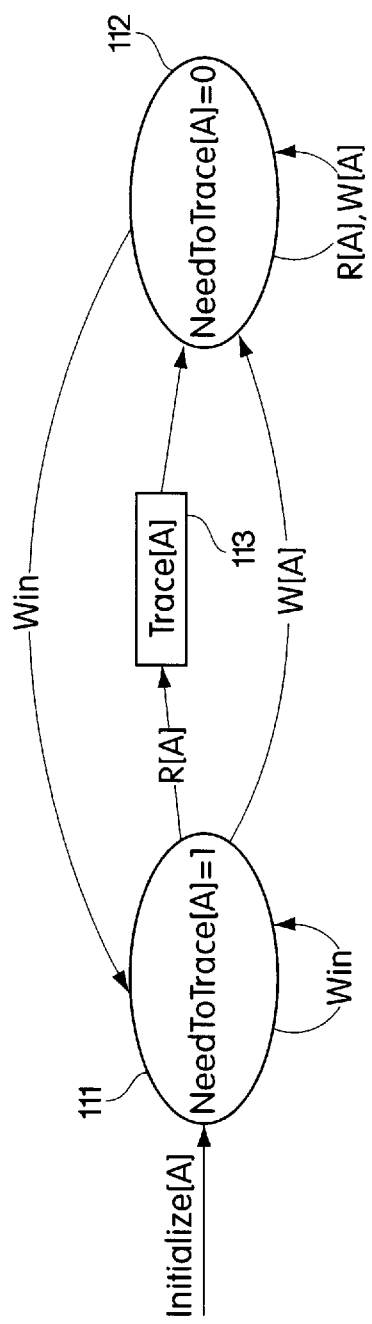
FIG. 11 is a two-state transition graph representative of a state machine which may be used to facilitate creation of a memory access trace file such as the one shown in FIG. 9.

As described above, a memory state location may be associated with each accessed memory location, to store a state representative of the data within the memory location during the execution phase 51. FIG. 11 depicts a two-state transition graph representative of a state machine which may be used for such a purpose. In FIG. 11, the label "WIN" is indicative of a window boundary being executed, the label R[A] is indicative of a read from memory location A being executed, and the label W[A] is indicative of a write to memory location A being executed, such executions taking place during the execution phase. Additionally, in FIG. 11 and subsequent state transition graphs, a circle is indicative of a state. A labeled arrow indicates a state transition caused by the occurrence identified by the arrow label. Transition functions, indicated by rectangular boxes, depict functions which are performed as a result of a transition from one state to another state.

FIG. 11 shows a "NeedToTrace[A]=1" state 111, and a "NeedToTrace[A]=0" state 112. These states 111, 112 are indicative of whether there is a need to trace the data currently stored in memory location A if the next access to location A is a read. These states indicate whether such a read would be unique-spanning-0. For this and subsequent examples, M=0 is assumed. Other values of M are discussed later. For example, when the execution phase 51 is initiated, the memory state location for memory location A is initialized to the state "NeedToTrace[A]=1." Such a situation indicates that if the data from memory location A is next read, the value of the data that was read should be traced (i.e., stored in the memory access trace file 42) because the read is unique-spanning-0. This situation is shown by the "TRACE[A]"function 113, performed in response to a read R of memory location A. If, however, a window boundary WIN is encountered during the state "NeedToTrace[A]=1" 111, then there is no need to store the value in location A for the just-completed window, as described above with respect to FIG. 3.

Additionally, if a write W to memory location A is executed during the state "NeedToTrace[A]=1" 111, then no subsequent read in the window can be unique-spanning-0, meaning there is no need to store the value in A during the current window, as exemplified in Window 1 of FIG. 3. Moreover, once the data for memory location A has been traced for a window, there is no further need to trace until a new window is begun, exemplified by the WIN transition back to the state "NeedToTrace[A]=1" 111.

Figure 12:
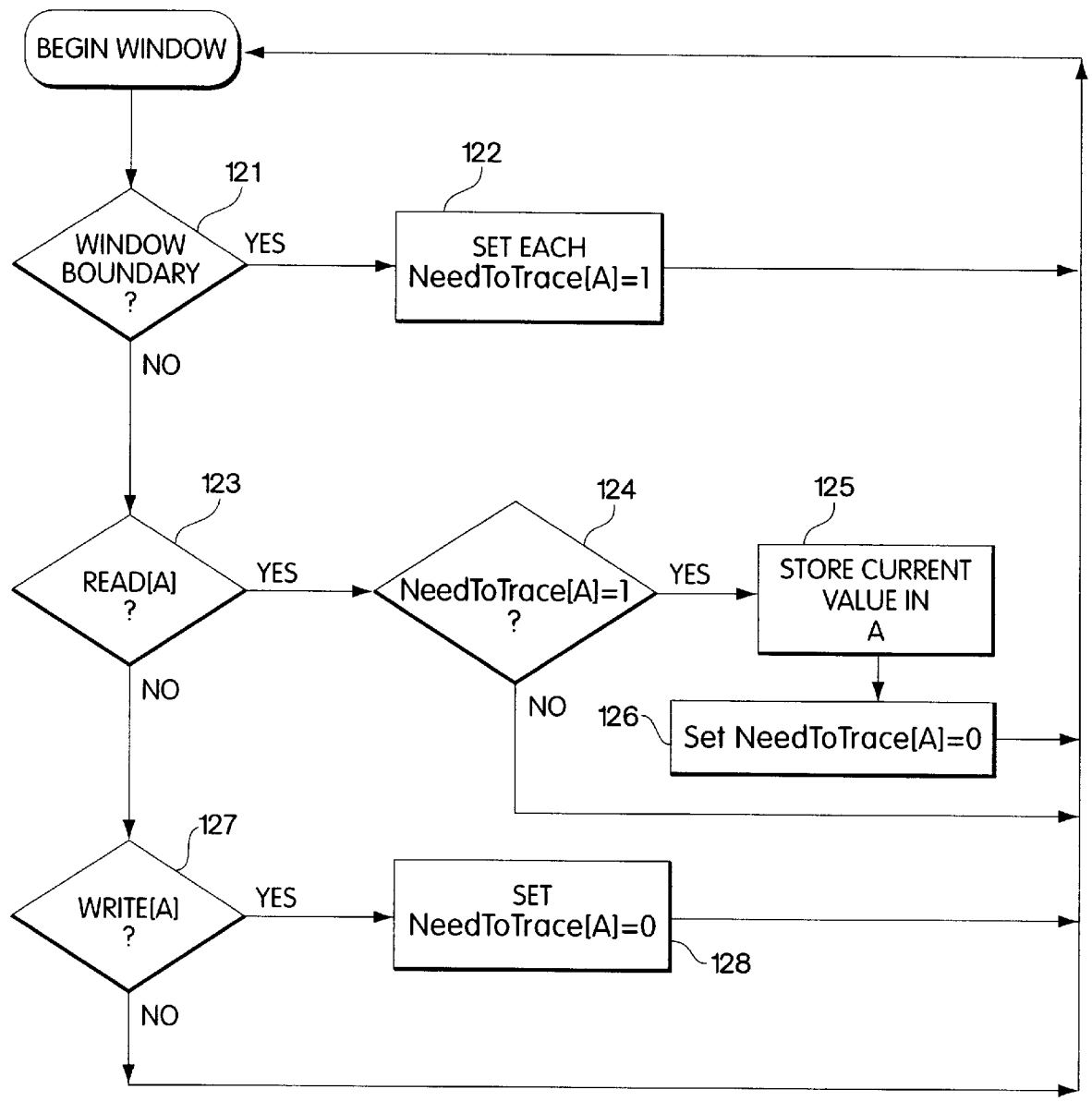
FIG. 12 is a flow diagram showing the process performed during an execution phase of a computer program in accordance with the two-state transition graph of FIG. 11.

FIG. 12 is a flow diagram showing the process performed during an execution phase 51 of a computer program in accordance with the two-state transition graph of FIG. 11. After execution begins, if a window boundary is encountered (step 121), then the NeedToTrace state for each memory location is set to 1 (step 122). Additionally, for each read of memory location A (step 123), the current state of NeedToTrace is determined in step 124. If the NeedToTrace [A] is not equal to 1, then there is no need to trace and the process may continue. If, however, the NeedToTrace[A] is equal to 1, then the current value in memory location A is stored as shown in step 125 and, in step 126, the value of NeedToTrace[A] is reset to zero. If a write to memory location A is encountered (step 127), then value of NeedToTrace[A] always is set to 0.

The state machine of FIG. 11 and associated process of FIG. 12 represent a straightforward implementation to create a memory access trace file 42. Such an implementation, however, may include storing data any time an access is made to any memory location. Such storage may slow down the execution phase 51 of the computer program depending upon how many memory locations are modified and how often such modifications occur. Therefore, it may be advantageous to facilitate storage of memory accesses only at particular times, such as window boundaries.

Figure 13:
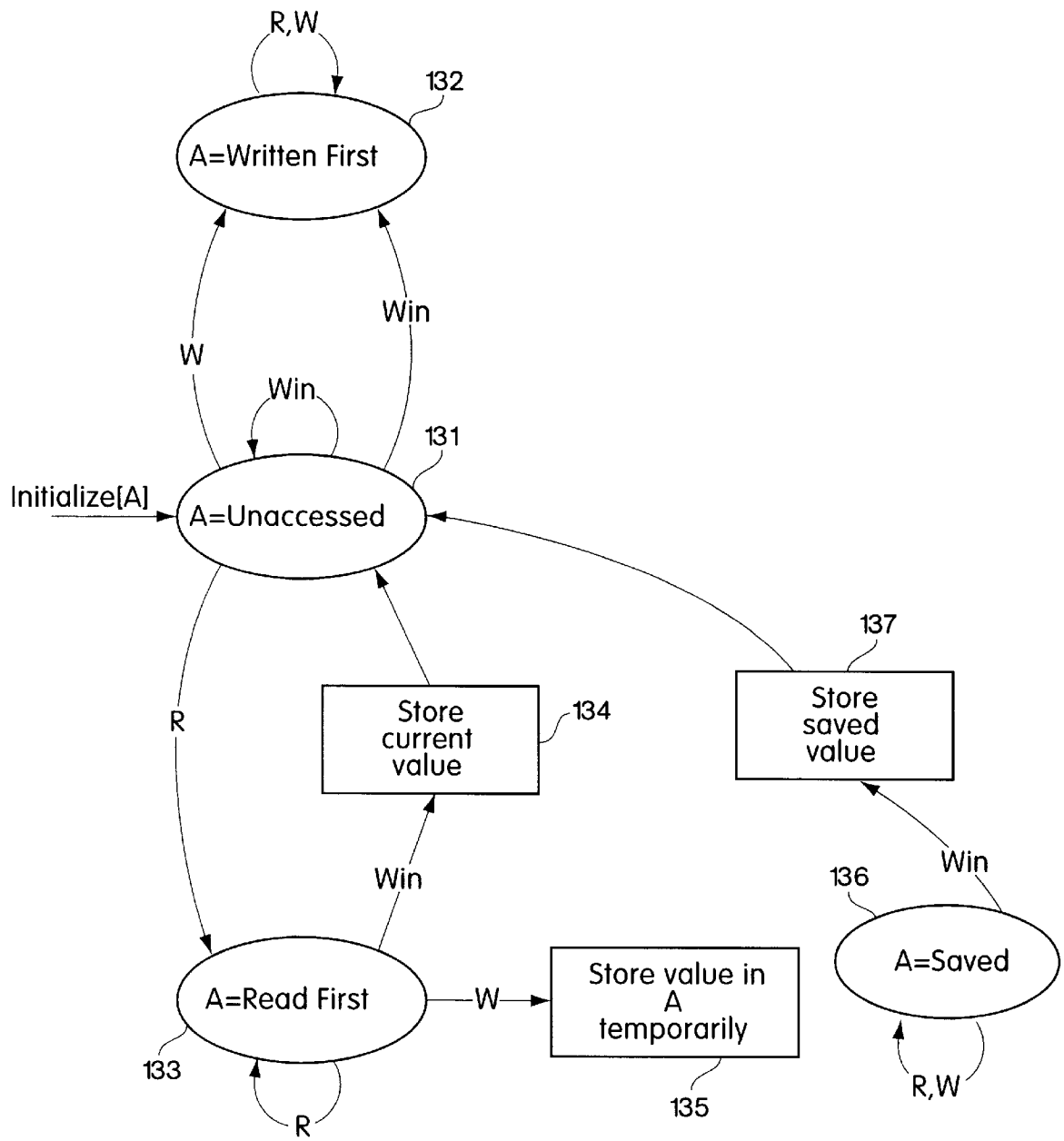
FIG. 13 is a four-state transition graph representative of a state machine which may be used to create a memory access trace file such as the one shown in FIG. 9, the four-state transition graph representing a process which facilitates storage of certain memory accesses at window boundaries as opposed to during each memory access.

FIG. 13 is a four-state transition graph representative of a state machine which may be used for such a purpose, and which still creates an accurate memory access trace file 42. The four states of such a state machine include: A=Unaccessed state 131, A=Written First state 132, A=Read First state 133, and A=Saved state 136. The state associated with memory location A is initialized to A=Unaccessed state 131 at the beginning of a window, and transitions to A=Written First state 132 if the first access to the memory location within the current window is a write W. As described above, such a situation does not require that a value be stored when a subsequent read occurs. Upon encountering a window boundary WIN from A=Written First state 132, however, the state is returned to A=Unaccessed state 131.

If the first access to memory location A from A=Unaccessed state 131 is a read R, then the state transitions to A=Read First state 133. This read R is a unique-spanning-0 read and the value read must therefore be stored, but not necessarily immediately, as subsequent reads do not change the value. The store may occur instead when the window's end WIN is encountered from A=Read First state 133, as shown by the "Store Current Value" function 134.

This method of delayed storage is effective if no writes W occur subsequent to the initial read R which is unique-spanning-0. However, a subsequent write may change the value in location A so that at the window's end the original value may be unavailable. Therefore, if a write W occurs from A=Read First state 133, then the data associated with the first read is temporarily stored or buffered by Store Value in A Temporarily function 135, and the state is changed to A=Saved state 136. Subsequent reads R and writes W do not affect such a state, but upon encountering a window boundary WIN, the data from the first read is stored as Store Saved Value function 137, and the state is returned to A=Unaccessed state 131.

Figure 14:
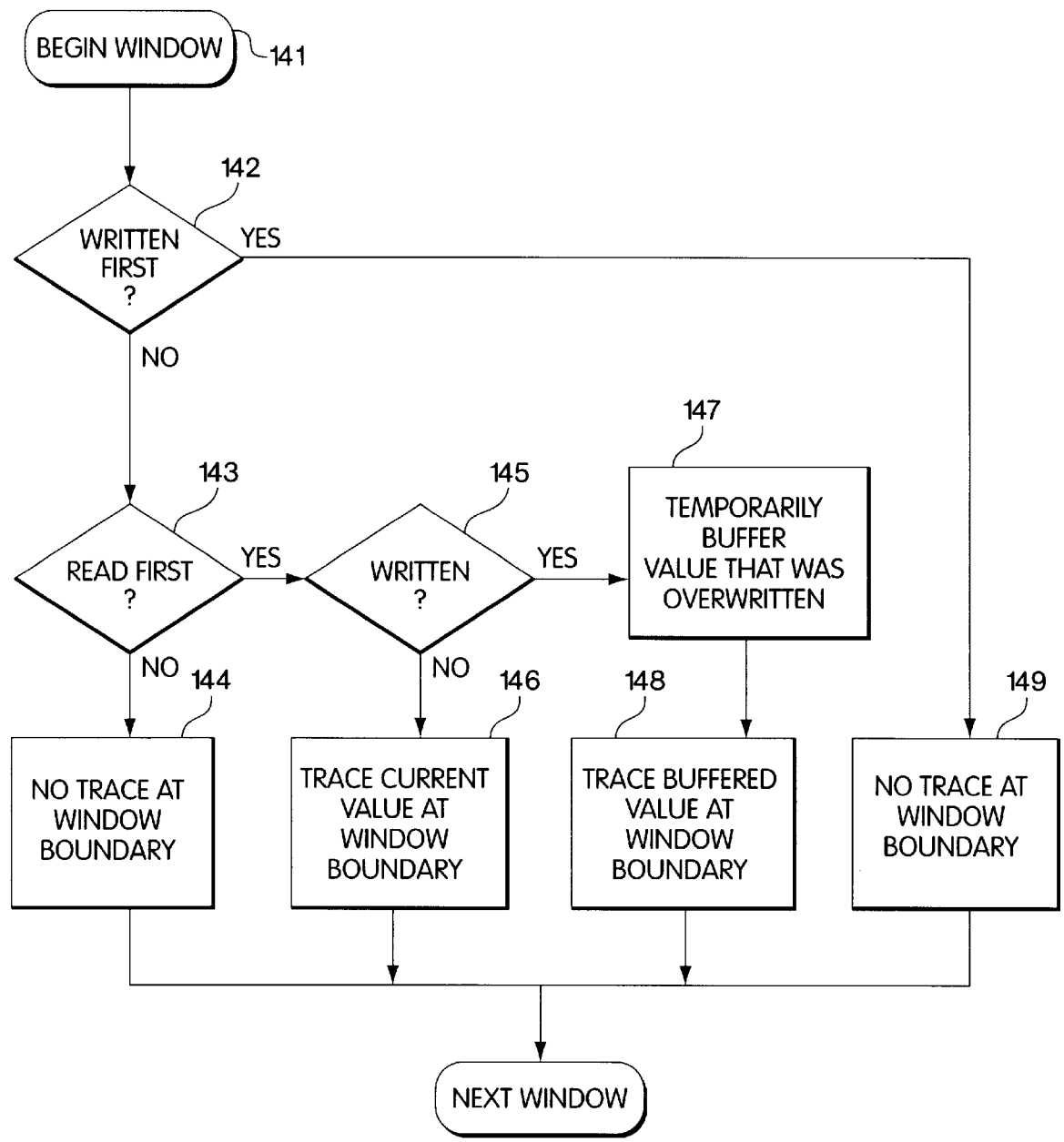
FIG. 14 is a flow diagram showing the process performed during an execution phase of a computer program in accordance with the four-state transition graph of FIG. 13.

FIG. 14 is a flow diagram showing the process performed during an execution phase of a computer program in accordance with the four-state transition graph of FIG. 13. As will be described with reference to FIG. 14, in one embodiment, all permanent storage of replay data is delayed until a window boundary is encountered to minimize interference with the original computer program during the execution phase 51.

Execution of instructions associated with a particular window is initiated in step 141. In step 142, if the data for a particular memory location is written prior to other accesses, then the process continues to step 149, which indicates that no trace must be performed at the window boundary. If data for the particular memory location is not written first, then if such data is read first as determined in step 143, then the process proceeds to step 145, which determines whether there are subsequent writes to the memory location. If there are no such subsequent writes, then the current value within the particular memory location is traced at the window boundary in step 146. If the memory location was neither written to nor read from, as determined in steps 142 and 143, then the memory location is unaccessed, and therefore no trace is required at the window boundary, as shown in step 144.

If, however, data is determined to have been written in step 145, which data would have been written over the data previously read, as determined in step 143, then the value that was overwritten is buffered in step 147, and then permanently stored in step 148. In these instances, the term "buffered" refers to the temporary storage until a window boundary is required, while the terms "trace" or "permanently store" refer to storage within the memory access trace file 42. The temporary storage may be within a register or RAM, and may be represented by a temporary file, and could be effected either by additional instrumentation added to the write hooks, by the operating system (by, for example, a copy-on-write mechanism), or by any other means of preserving the original values in the memory locations written to by a window's execution.

Figure 15:
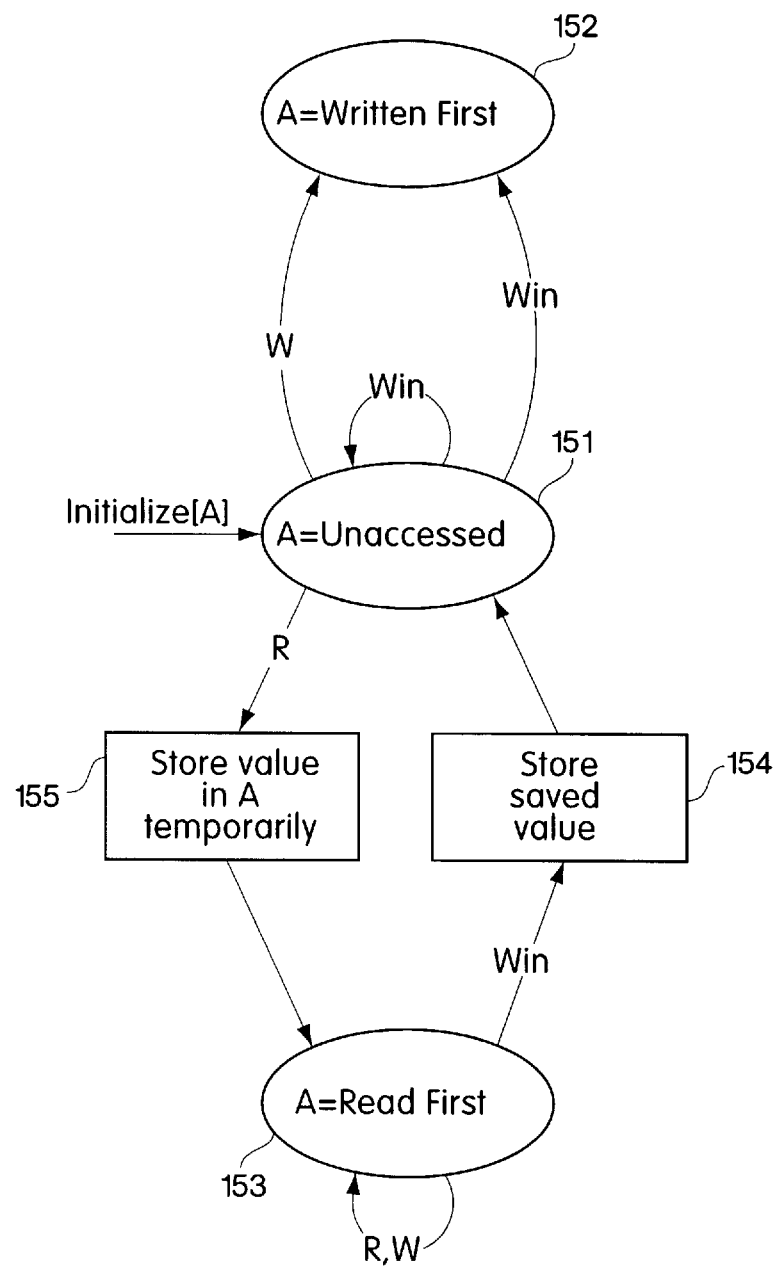
FIG. 15 shows an alternate embodiment of the four-state transition graph of FIG. 13.

Another possible embodiment which delays, until the end of each window, the storage of values required to support replay is shown in FIG. 15. The three states of this machine include A=Unaccessed state 151, A=Written First state 152, and A=Read First state 153. The state associated with memory location A is initialized to A=Unaccessed state 151 at the beginning of a window, and transitions to A=Written First state 152 if the first access to the memory location within the current window is a write W. Upon encountering a window boundary WIN from A=Written First state 152, however, the state is returned to A=Unaccessed state 151.

If the first access to memory location A from A=Unaccessed state 151 is a read R, then the state transitions to A=Read First state 153. Unlike the state machine represented in FIG. 13, however, the state machine in FIG. 15 also temporarily buffers the value in memory location A as "Store Value in A Temporarily" function 155. As previously discussed, this temporary buffering can be accomplished with additional instrumentation, by the operating system (by, for example, making a copy of the process at the beginning of each window), or by any other means which preserves the original value that exists in memory location A at the beginning of the current window. As an optimization, the buffering need not take place immediately but can be delayed until a subsequent write occurs since subsequent reads do not alter the value. In addition, the buffering could occur before any reads or writes occur, such as at the beginning of the window. Since subsequent reads R and writes W do not affect the machine's state, upon encountering a window boundary WIN, the data from the first read is stored as "Store saved Value" function 154 and the state is returned to A=Unaccessed state 151. An advantage of the state machine represented in FIG. 15 is that, because fewer states are required, a faster implementation of the state machine may be possible than with the state machine of FIG. 13.

Thus, in accordance with an embodiment of the invention characterized by the states and processes shown in FIGS. 13 and 14, memory accesses are monitored during an execution of windows or segments of a computer program, to determine whether an accessed value should be stored to support replay. Only at the end of each segment are accessed values stored, so that interference with the computer program 39 is minimized during the execution phase 51.

The approach shown in FIGS. 13, 14, and 15 may be adapted to create an embodiment which facilitates a system that includes partial reads, partial writes, and system calls. In particular, some CPU's allow partial reads and partial writes wherein only a portion of the data storage capability of a memory location is read from or written to the location. For example, a memory location may include a 32 bit word of information. A partial write to such a memory location may result in modifying either of the two 16-bit half-words of the memory location, or any of the four 8-bit bytes in the memory location, leaving the remainder of the information intact. Because such instances do not write to the entire memory location, such partial writes should not be used to avoid a trace at a window boundary, such as shown in step 149 of FIG. 14.

Additionally, as discussed above, a system call typically provides a write to one or more memory locations in response to a computer program invoking the system call. Because such a situation represents a possible modification to memory (depending on the values of the parameters passed to the system call), such system calls may be monitored and a state of the memory state location modified accordingly during the execution phase 51. Other computer programs or processes which may modify a memory location represent a similar situation to a system call, because any such process may represent a change to memory not performed directly by the original computer program. Accordingly, the concepts described herein with respect to system calls are equally applicable to other concurrent processes.

Figure 16:
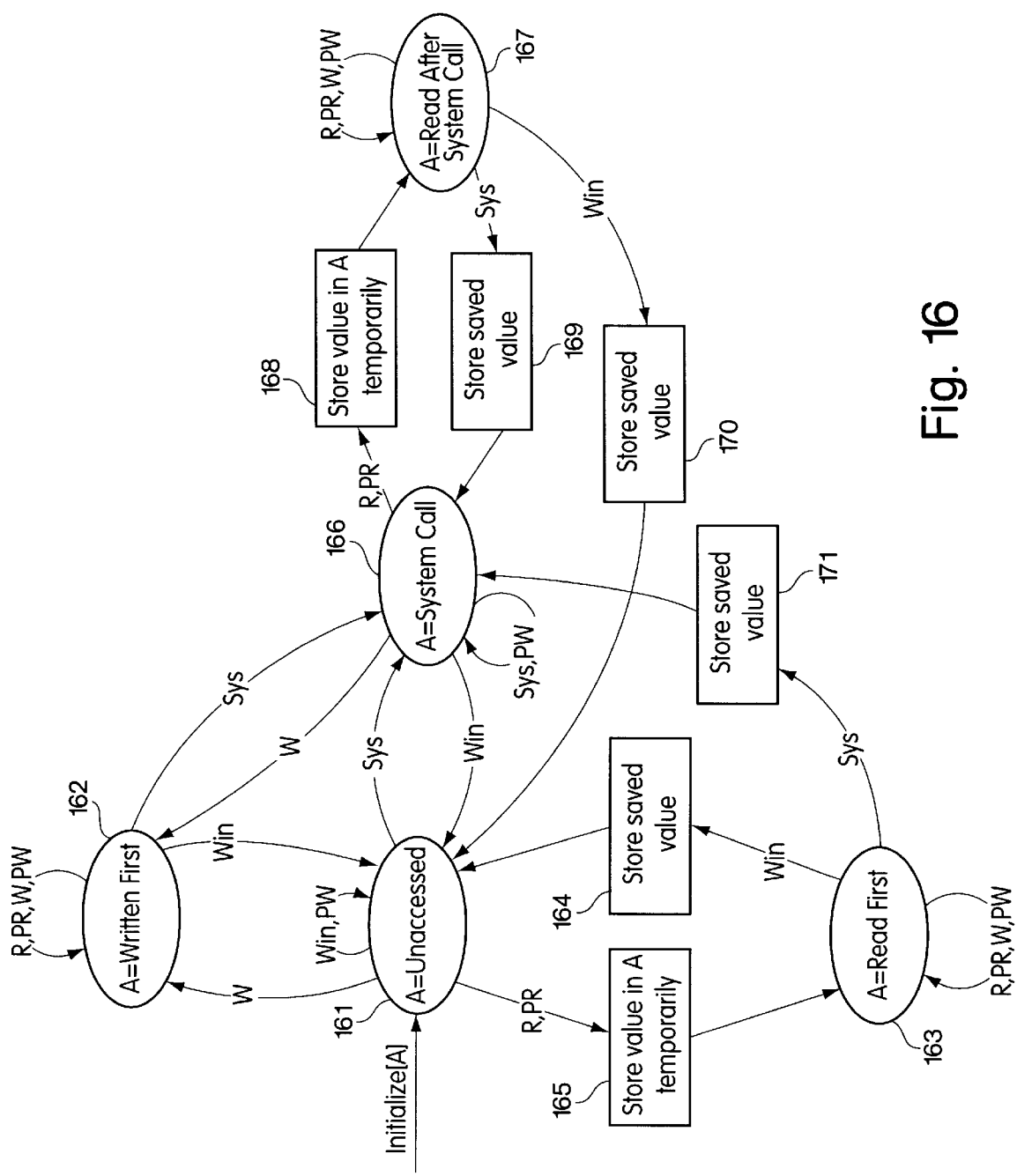
FIG. 16 is a five-state transition graph representative of a state machine which facilitates creation of a memory access trace file such as the one shown in FIG. 9, the five-state transition graph also operating in response to partial reads, partial writes, and system calls.

FIG. 16 is a five-state transition diagram representative of a state machine which may be used to create a memory access trace file such as the one shown in FIG. 9, for an embodiment of the invention in which partial reads, partial writes, and system calls are supported. Several of the states and functions of FIG. 16 are similar to those of FIG. 15. For example, the Unaccessed state 161 represents an initial state for a memory location. If the first access to the memory location is a write W, then the state transitions to Written First state 162. If a window boundary WIN is encountered at this point, the state may be returned to Unaccessed state 161 and no trace is required. However, if a system call Sys occurs, that can potentially modify the memory location, while in the written first state 162, a transition is made to a System Call state 166. Note that a partial write PW access that occurs while in the Unaccessed state 161 does not cause the state to change, as the modification of part of the memory location is not sufficient to preclude a future trace of the location in the current window (as mentioned earlier).

Either a read R or a partial read PR from the Unaccessed state 161 causes a transition to the Read First state 163, and the value currently stored in memory location A is temporarily buffered by "Store Value in A Temporarily" function 165. As previously discussed regarding the state machine represented in FIG. 15, this buffering need not occur immediately but can be delayed up to the point where a subsequent write occurs to the memory location being monitored. Also, the buffering could be performed automatically by the operating system. From state 163, if a window boundary WIN is encountered, then the temporarily buffered value of the memory location being monitored is stored, as shown by "Store Saved Value function" 164, and the state is returned to Unaccessed state 161. Typically, as described above, the value is stored in the memory trace file 42. Subsequent reads R, writes W, partial reads PR, or partial writes PW do not affect the state once the machine is in the Read First state 163.

If a system call Sys is encountered while in the Read First state 163, then the temporarily buffered value is stored by the "Store Saved Value" function 171 and the state is changed to the System Call state 166. From the System Call state 166, a window boundary WIN causes a transition to the Unaccessed state 161. Another system call Sys, or a partial write PW, from the System Call state 166 causes no state transition, leaving the machine in the System Call state 166. If, however, either a read R or partial read PR is detected during the System Call state 166, the value of the memory location being monitored is temporarily buffered (as discussed previously) by the "Store Value in A Temporarily" function 168 and the state is changed to Read After System Call state 167. If a window boundary WIN is encountered from state 167, then the temporarily buffered value is stored by the "Store Saved Value" function 170 and the state is returned to the Unaccessed state 161. If a system call Sys is encountered from the Read After System Call state 167, then the temporarily buffered value is stored by the "Store Saved Value" function 169 and the state is returned to the System Call state 166.

Any reads R, writes W, partial reads PR, or partial writes PW encountered while in the Read After System Call state 167 do not cause the state to be changed. If a write W is encountered while in the System Call state 166, the state is changed to the Written First state 162 to indicate that no further trace of the memory location being monitored is required in the current window, unless another system call occurs that can potentially modify the memory location.

The embodiments of the invention characterized by the states and processes shown in FIGS. 13, 14, 15, and 16 monitor memory accesses, including reads, writes, partial reads, partial writes, and system call writes, during an execution of windows or segments of a computer program, to determine which accessed values should be stored to support replay. Only at the end of each segment are accessed values stored.

Another embodiment of the invention extends the state machines shown in FIGS. 13, 14, 15, and 16 so that at the end of a window or segment of a computer program, it is also known exactly which memory words were written to, by a write, partial write, or system call write, during the window or segment. This information can then be used, at the end of the window or segment, to produce information for another trace file, or to alter the state associated with each of the written memory locations. By producing another trace file, information can be recorded about exactly which memory words are written or partially written in each window. Such information can then be used to aid program debugging. Moreover, the state associated with the written memory locations can be updated to record information about the modification, such as in which window or segment the modification occurred, or an identification of the instruction which modified the memory location, or a combination of these or other information. This additional state information can be used to augment traces of future windows (for example, by including in the trace record for each read value information regarding in which previous window that value was originally written) or to aid in program debugging.

Figure 17:
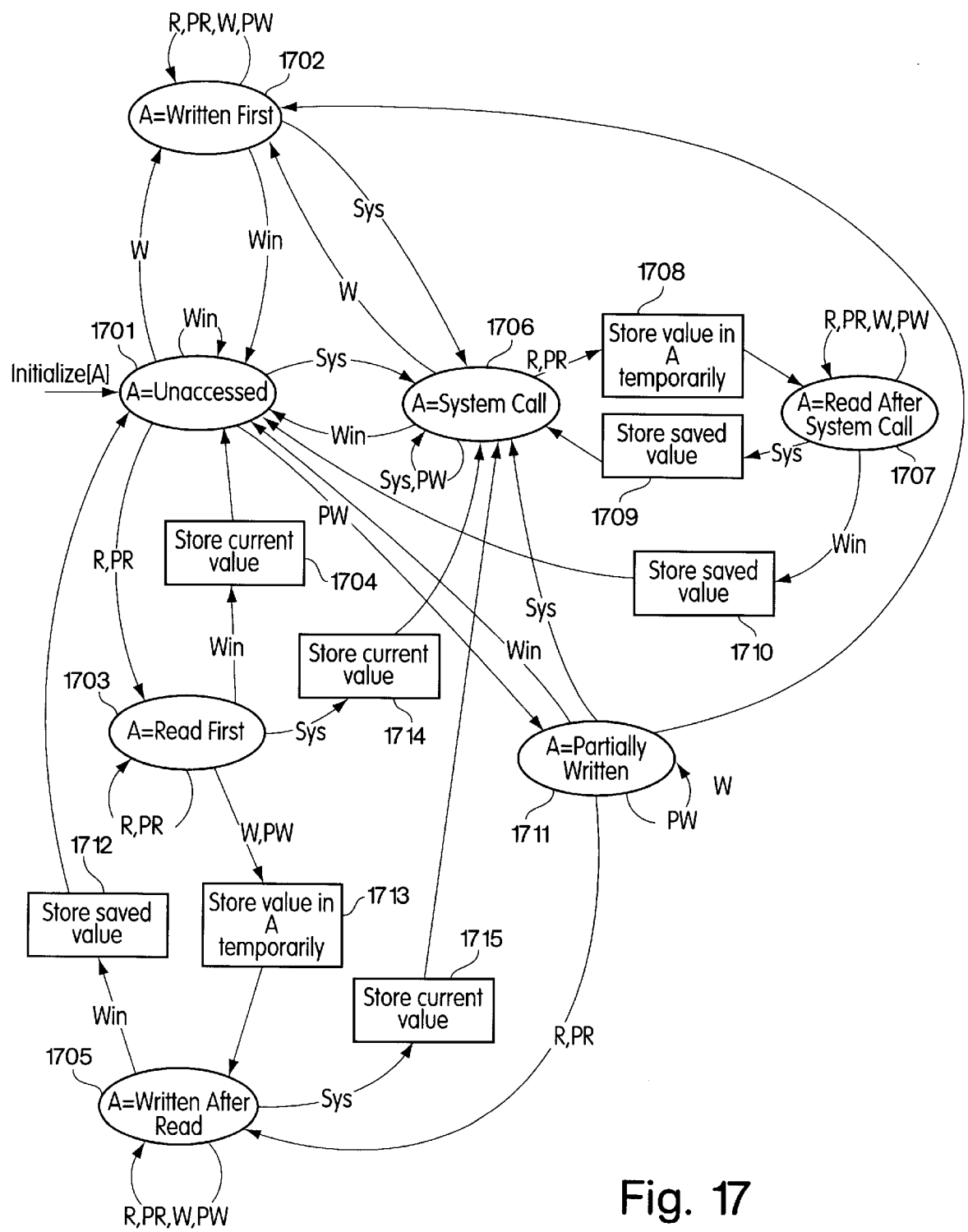
FIG. 17 is a seven-state transition graph showing a state machine similar to that shown in FIG. 16, but which can also determine whether a particular memory location was accessed during a particular segment of a computer execution.

To this end, FIG. 17 represents a seven-state machine which is based on the machine shown in FIG. 16 but which is capable of determining, at a window's end, exactly whether a monitored memory location was written to during that window. The state machine in FIG. 17 contains all of the states and actions of the machine in FIG. 16, except that when a read R or partial read PR is made from the A=Unaccessed state 1701, resulting in a transition to the A=Read First state 1703, the value read is not temporarily buffered. As a result, when a window boundary Win is encountered from state A=Read First 1703, the value currently in the memory location being monitored is stored by the "Store Current Value" function 1704 and the state is returned to A=Unaccessed 1701. In addition to the states and actions of the machine in FIG. 16, the machine in FIG. 17 also contains two additional states and associated actions. The purpose of these additional states and actions is to discern whether the monitored memory location has yet been written to in the current window. The first additional state is A=Partially Written 1711 which is transitioned to from the A=Unaccessed state 1701 when a partial write PW is encountered. This transition encodes the fact that some part of the monitored memory location has been partially written, and not yet read or completely written. From the A=Partially Written state, transitions occur on a write W, system call write Sys, or window boundary Win in a way analogous to the transitions from the A=Unaccessed state 161 of FIG. 16. A partial write PW causes no state change from the A=Partially Written state 1711. The second additional state present in the machine of FIG. 17 that is not present in the machine of FIG. 16 is the A=Written After Read state 1705. This state is transitioned to from the A=Read First state 1703 upon encountering a write W or partial write PW, and the "Store value in A temporarily" function 1713 temporarily buffers the value in the monitored memory location before the write or partial write overwrites the value. This state serves two purposes. It encodes the fact that the monitored memory location has been written in the current window, and it encodes the fact that the location must be stored and the original value to be stored exists in the temporary buffer. When a window boundary Win is encountered from this state, the temporarily buffered value is stored by the "Store Saved Value" function 1712 and the state is returned to A=Unaccessed 1701. Similarly, when a system call write Sys is encountered, the temporarily buffered value is stored by the "Store Saved Value" function 1715 and the state is changed to the A=System Call state 1706. However, subsequent reads R, partial reads PR, writes W, or partial writes PW encountered while in the A=Written After Read state 1705 cause no state transition.

As mentioned previously, the state machines discussed above are designed to trace the values of the unique-spanning-0 reads; i.e., M=0. It is possible to extend these machines to other values of M. Specifically, for small non-zero values of M, additional states can be added to each machine to count, upon storing the value of a memory location, the number of subsequent windows which pass before the location is written to. In such an augmented machine, a Win transition would not always cause the state to return to the Unaccessed state, but would return to Unaccessed only upon the passage of M windows subsequent to a value being stored, as it is only at that point that the stored value is no longer capable of preventing future reads from being unique-spanning-M. Generally, approximately M additional states are required to count up to M. For the case of unique-spanning-infinity reads, however, additional states may not be required.

State machines such as those represented by the state transition graphs of FIGS. 11, 13, 15, 16 and 17 may be implemented by a state computer program which determines a current state, receives an input indicative of a possible state change, and determines a new state from the current state and the input. Such a state computer program, which may also be referred to as a state control mechanism, is represented by memory state control 45 of FIG. 4, and may be embodied by distributed instructions inserted into the run-time instrumented program. Such state machines also may be implemented by dedicated hardware, or by a second CPU running a second computer program that is called by the memory state control 45. Such implementations minimize interference with the run-time instrumented program during the execution phase 51, but require additional resources such as the dedicated hardware or a second CPU to run the second computer program. Since the state machine associated with each memory location is being manipulated during an execution of the run-time instrumented program, it is desirable to minimize any interference with the original computer program, and thus minimize processes performed to manipulate the state machine.

Toward this end, a sequence of bits may be used to store, for each memory location in the computer program being monitored, the current state of the state machine associated with that memory location. Several example bit layouts are described below, but regardless of how the state is represented, every invocation of a state machine, which occurs in response to a reference of a memory location by a read, write, partial read, partial write, or system call write, must begin by looking up the current state associated with that memory location. As discussed above, to minimize interference with the original computer program, it is desirable to make the mapping from a memory address to its associate state as quickly as possible.

Figure 18:
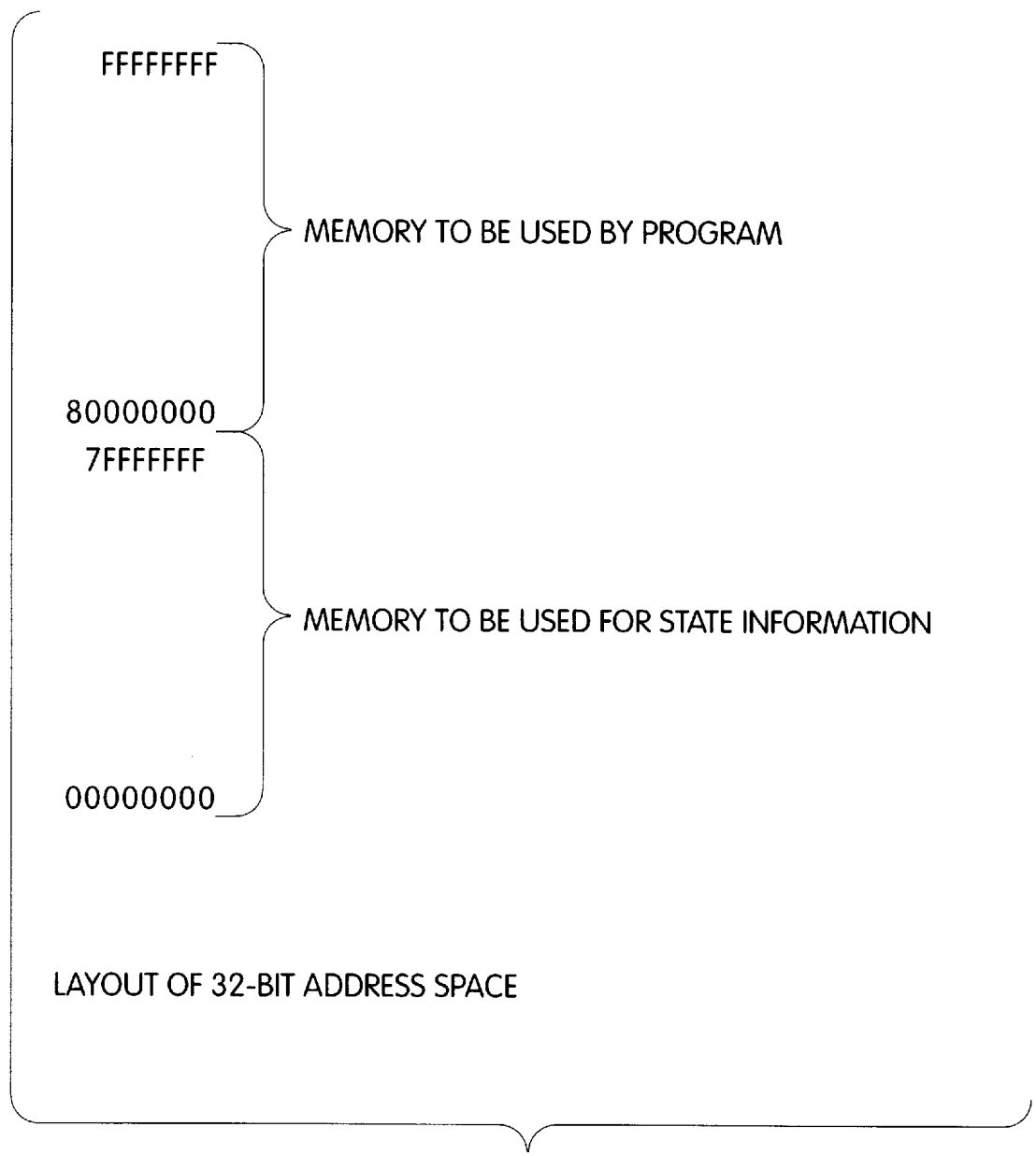
FIG. 18 illustrates a memory map in which address space is segmented into two portions to allow a monitored memory location to be mapped to a different location.

One way to perform this mapping is to segment the address space of the computer program being monitored into two halves, as illustrated in FIG. 18. Typically, the set of all possible memory locations that a computer program can occupy is called its "address space." For example, on 32-bit CPU's, each memory location is addressed by a 32 bit quantity (its "address") and therefore on such a CPU a computer program can typically occupy up to 4,294,967,296 memory locations (2 raised to the power 32). It is common for programs to require only a small fraction of the address space. As a result, by splitting the address space into two halves, and allowing the program occupy only one half (such as the upper half), no significant limitations are imposed. An advantage of this splitting is that the lower half can then be used to store the states associated with the memory locations used by the monitored program, which now reside only in the upper half. More specifically, for a memory location in the upper half of the address space whose address is A, its associated state can be stored in the lower half of the address space at an address that is easily computed from A, for example by zeroing the high bit in the binary representation of A. This zeroing will compute an address that has the same relative offset from the start of the address space as A has from the middle of the address space. Using this technique, any memory location's address can be quickly mapped to its associated state by zeroing its high-order bit (which, on a 32-bit processor, is equivalent to adding or subtracting the constant 80000000 (expressed in hexadecimal) and ignoring any resulting overflow). Moreover, this technique is not limited to splitting in half or zeroing of the high bit. Any scheme that splits the address space into segments which allows an address to be mapped to its associated state is suitable.

Another approach which does not require splitting the address space into a small number of contiguous regions is to use a "two-level bitvector." In this context, a two-level bitvector is a table, indexed into by a memory location address, that contains the state associated with that address. Two-level bitvectors have been used in the past to associate state with each memory location. Such use of a two-level bitvector is described in more detail by R. Wahbe, S. Lucco, and S. L. Graham, "Practical Data Breakpoints: Design and Implementation", Proceedings of the SIGPLAN Conference on Programming Language Design and Implementation, June 1993, which is hereby incorporated by reference herein.

Figure 19:
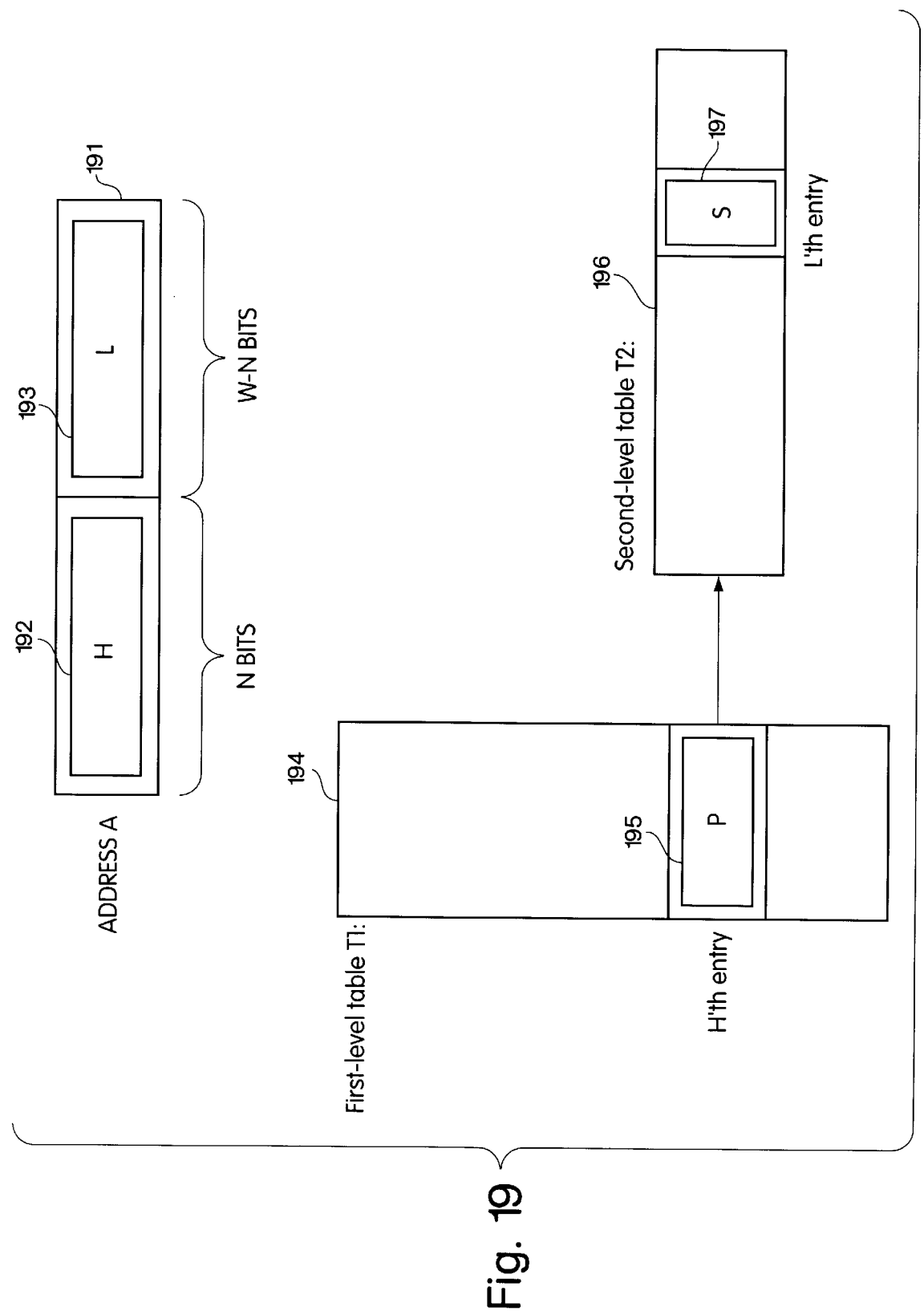
FIG. 19 shows a two-level bitvector data structure by which one particular address location may be referenced to data in another address location.

A standard design of a two-level bitvector is described by FIG. 19. An address A 191 is referenced to the tables 194, 196 to retrieve its associated state S 197 as follows. The address A 191 is viewed as being composed of N high-order binary bits and W-N low-order binary bits where W is the number of bits in a memory word. Let H 192 represent the value of the high-order N bits when these bits are viewed by themselves as a number, and let L 193 be the value of the low-order W-N bits when these bits are viewed by themselves as a number. To index into the two-level bitvector, the number H 192 is extracted by shifting the address A 191 right by N binary bits, leaving A 191 itself unchanged. The number H 192 is then used to index into the first-level table T1 194. In this case, the term "index into" means to retrieve the value P 195 from the H'th entry of the table T1 194 (denoted T1[H]). The value P 195 is either a special NULL value indicating that the second-level table containing the state associated with A has not yet been allocated, or it is an address (or "pointer") to a previously allocated second-level table T2 196. If the value P 195 is NULL, which generally will happen upon the first attempt to access the state associated with A 191, then a new second-level table may be allocated from free memory, and a pointer to this newly allocated second-level table must be inserted into T1 [H]. This second-level table T2 196 contains the state associated with the range of addresses that have H 192 as their high-order N bits, so the second-level table T2 196 is generally of a size sufficient to contain such states.

The second step in indexing into the two-level bitvector is to extract L 193 by zeroing the high-order N bits of the address A 191, leaving A 191 itself unchanged. L 193 is used to index into the second-level table T2 196 to retrieve the state S 197 associated with the address A 191. The state S 197 can consist of any number of desired bits, although if the number of associated bits does not fit evenly into a memory word, then additional bit packing and unpacking operations may be required to extract only the relevant bits. An advantage of the standard two-level bitvector as just described is that state can be associated with any memory address, so that no restrictions need to be placed on which memory locations can be monitored. Yet, only the second-level tables that contain the state associated with locations that are actually monitored need be allocated, and therefore the amount of space actually used to store second-level tables is proportional to the number of memory locations being monitored instead of to the total possible number of memory locations in the address space, as with a simple memory offset such as that shown in FIG. 18.

Figure 20:
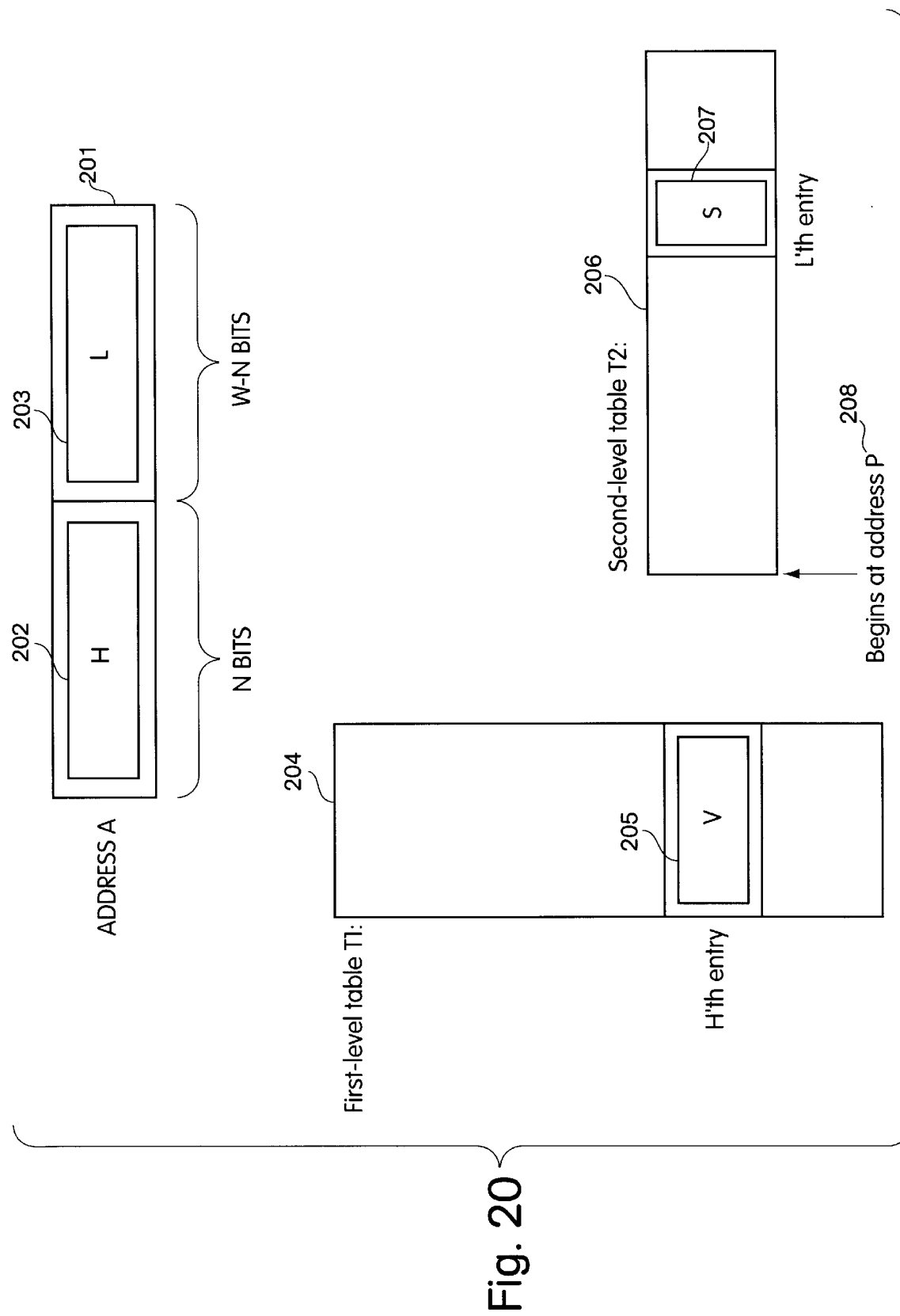
FIG. 20 shows an alternate two-level bitvector data structure which is similar to that shown in FIG. 19, but which typically requires less address calculations.

The standard two-level bitvector data structure described above may be used to map an address to its associated state for the purpose of supporting incremental replay. Such an approach typically involves a sequence of address calculations, which may increase interference to the original computer program. An alternate approach, which may be faster because it avoids some of these calculations is shown in FIG. 20. As above, a first-level table T1 204 is still used, but the table entries do not contain pointers to the second-level tables. Instead, the H'th entry of the first-level table T1 204, denoted T1 [H], contains a value V 205 which, when added directly to the address A 201 (without first extracting the high-order binary bits H 202 of A 201), will yield either the pointer P 208 to the second-level table that contains the state associated with A 201 if the second-level table has been previously allocated, or a special NULL if the corresponding second-level table has not yet been allocated. The initial value of each first-level table entry is chosen so that when an address is added to it, the resulting value is distinguishable as representing a special NULL value to indicate that the second-level table has not yet been allocated. Once a second-level table has been allocated for the H'th entry of the first-level table T1 204, the value V 205 is set equal the starting address P 208 of the second-level table minus a value that is constructed by zeroing the low-order W-N bits of the address A 201 (i.e., a word whose low-order W-N bits are all zeros and whose high-order N bits equal the value H 202). This value, when added to any address whose high-order N bits equal H, will yield back the pointer P 208. An advantage of this approach is that the second-level table T2

206 can be accessed without first requiring the high-order N bits of the address A 201 to be first zeroed, thereby saving several operations and reducing the interference to the original computer program.

The various state machines previously described generally operate by changing to a new state based on the current state in response to a memory access (read, write, partial read, partial write, system call write) or a window boundary. To limit the amount of interference of the original computer program, the state of each state machine can be represented in various ways by a sequence of bits that are arranged to allow a small and fast implementation of the state transition operations. Specifically, to achieve a fast implementation, it is desirable to minimize the number of conditional tests as such tests can alter the condition code registers on some CPU's and therefore such registers would have to be saved and restored, incurring additional interference. In addition, conditional tests often involve a conditional branch instruction which can be costly on some CPU's. In addition, it is also desirable to avoid a table lookup to determine the next state given the current state and type of access. A table lookup would require an additional memory access which would also increase the interference to the original computer program.

To this end, one possible bit arrangement which may be used to represent the state of the state machine of FIG. 15 is to use two bits labeled "R" and "W". The R bit encodes whether a read of the monitored memory location has yet occurred in the current window. The W bit encodes whether the first access to the monitored memory location in the current window was a write. At the beginning of a window, the R bit is initialized to 1 and the W bit is initialized to 0. Then, the hook for a read operation need only set the R bit to 0. The hook for a write operation sets the W bit equal to the current value of the W bit logically OR'ed with the current value of the R bit. One advantage of this encoding scheme is that the two bits can be arranged in a computer word to allow the read hook to be one or two instructions (zeroing the R bit), for example by storing the R and W bits in separate bytes of the state word so that they can be individually accessed with a single instruction. Since read operations can occur more frequently than write operations, making the read hook as fast as possible can reduce the amount of overall interference of the original computer program. Moreover, as discussed above, it may be desirable to minimize conditional tests during the execution phase 51. In certain CPUs, the logical OR command represents very few machine cycles because the appropriate bit, in this case bit W, is modified during the same instruction in which it is accessed. Thus, in such a system, the logical OR of data stored within two registers is not considered a conditional test.

This bit arrangement may easily be extended to represent the state of the state machine of FIG. 16 by the addition of a single bit labeled "S" to encode whether the machine is in either of the A=System Call state 166 or A=Read After System Call state 167. The manipulation of the S bit is easily accomplished due to the relatively high cost of a system call and the relatively small number of system calls as compared to the number of reads, partial reads, writes, and partial writes. As a result, the system call hook can perform much more processing than the read, partial read, write, or partial write hooks without severely impacting the amount of interference caused to the original computer program.

Figure 21:
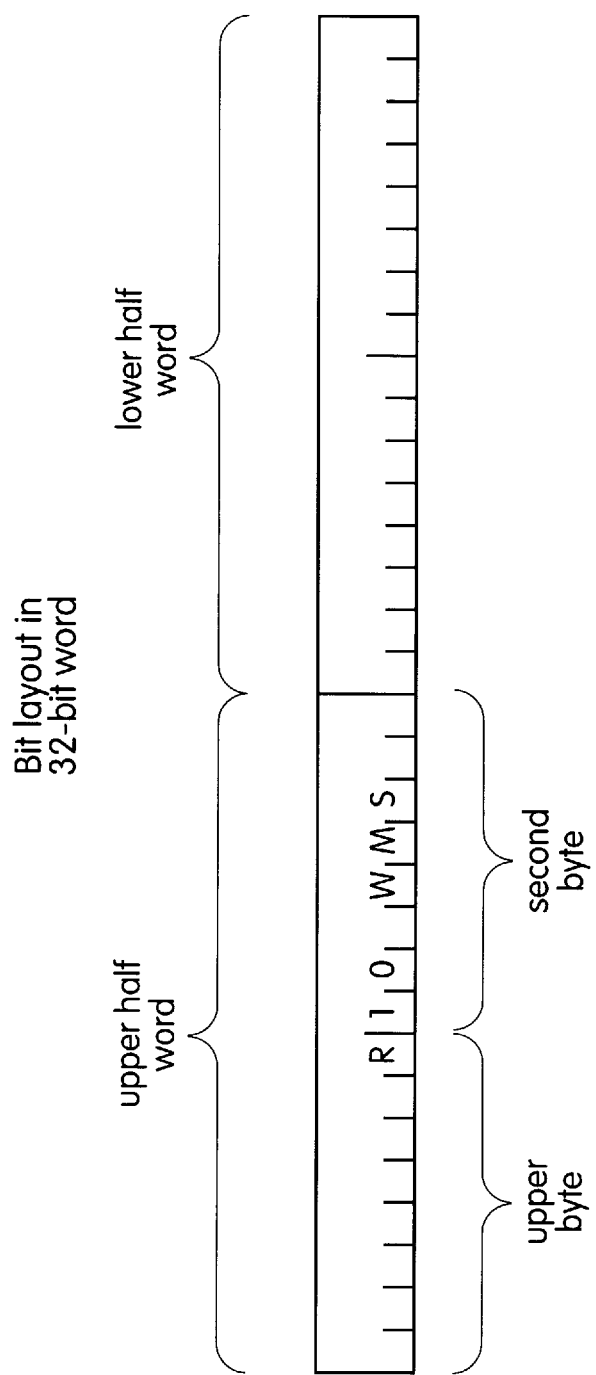
FIG. 21 is a table of bit assignments which may be used to represent the states associated with the state transition graphs described earlier.

Another possible bit arrangement, which is appropriate to represent the state of the state machine of FIG. 17, is illustrated in FIG. 21. Four bits, labeled R, W, M, and S, are used to represent the current state. The R bit encodes whether the monitored memory location has been read (R=0) or not yet read (R=1) in the current window. The W bit indicates whether the monitored memory location was written to before being read (W=1) in the current window, or whether it was written first or is as yet unaccessed (W=0). The M bit indicates whether the monitored memory location has been written to at all in the current window (M=1) or not written to (M=0). The S bit encodes whether the state machine is currently in one of the two system-call related states; S=1 indicates that the machine is in the A=System Call state 1706 or the A=Read After System Call state 1707, while S=0 indicates that the machine is not in either of these two states. Therefore, the bit sequence which represents the Unaccessed state is RWMS=1000 (i.e. R=1, W=0, M=0, and S=0). Additional bit sequences are as follows: Read First state, 0000; Written First state, *11*; Partially Written state, 1010; Written After Read state, 0010; System Call state, 10*1; Read After System Call state, 00*1. In these bit sequences, an asterisk ("*") indicates that the associated bit may be either binary 1 or 0.

Such bits may be allocated in alternative arrangements, depending upon the available processing and the amount of interference which can be tolerated during the execution phase. For example, the bit arrangement depicted in FIG. 21, shown for a 32-bit computer word, minimizes conditional tests and table lookups to be made during the execution phase to determine the next state following a memory access. The word shown in FIG. 21 represents the state associated with a monitored memory word and encodes the current state of the state machine as just described. The four bits R, W, M, and S may be stored in the upper half-word of the state word. Note that several of the bits in the second byte are always 1 or 0, as shown. In bit fields where no value is shown, the value is irrelevant. The lower half-word can be used for additional state information, such as to store an interval number indicating in what interval prior to the current interval the monitored memory location was written. In this context, an "interval number" is an integer quantity which identifies a past window or segment of the computer program and could be computed by, for example, assigning each window a unique number beginning with the number 1. An advantage of this bit layout is that the hooks to implement the transitions on read, partial read, write, and partial write can be made small and fast. Although there are unused bits in the memory word shown in FIG. 21, such an implementation may be advantageous for certain CPUs. Additionally, the R bit, which is manipulated in response to a read R or partial read PR, is stored in the bottom bit of the high-order byte so that the bit may be cleared with a single instruction.

Figure 22:
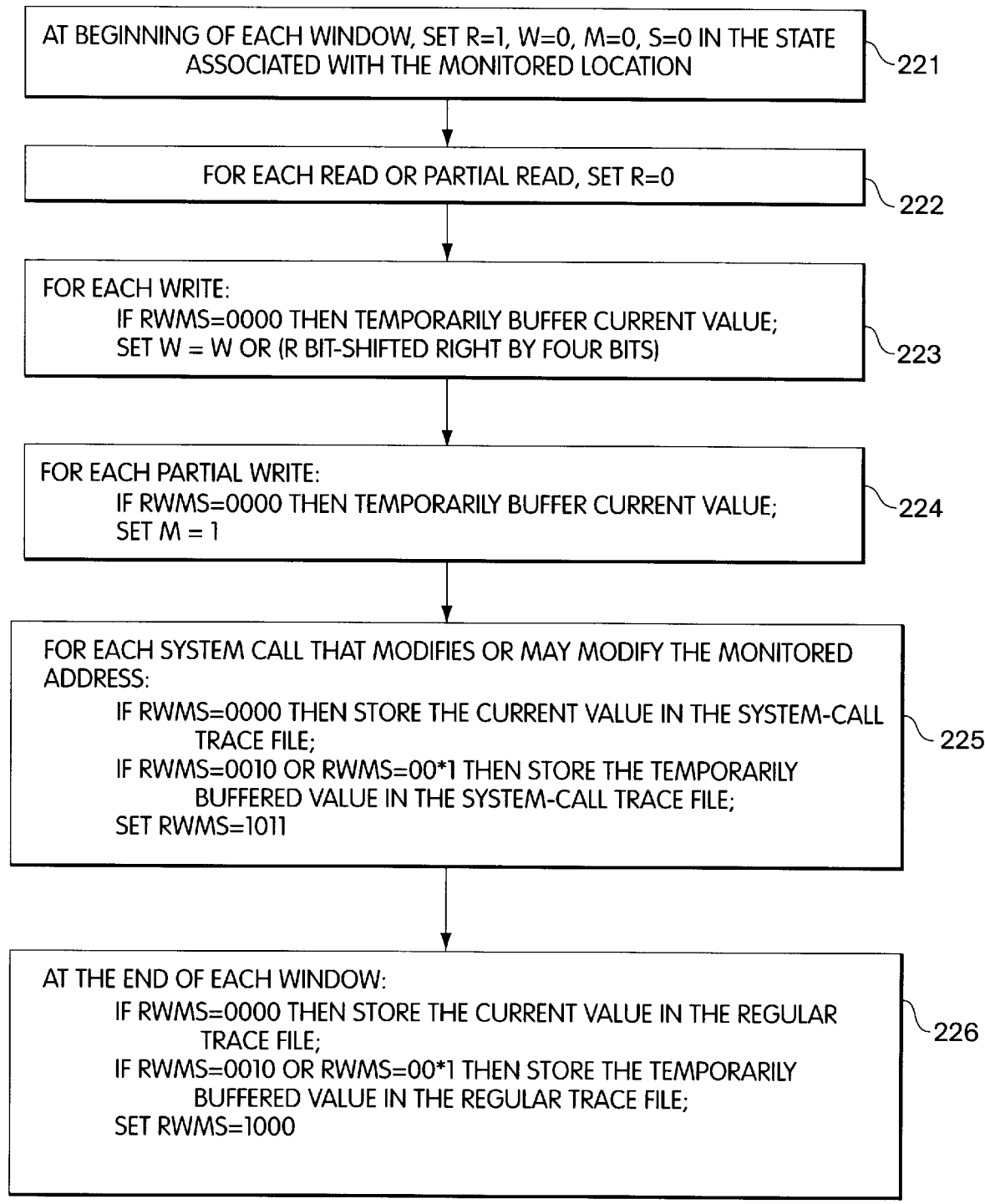
FIG. 22 is a flow diagram showing the process performed during an execution phase of a computer program for one embodiment of the invention in accordance with the seven-state transition graph of FIG. 17 and the bit assignments of FIG. 22.

FIG. 22 depicts an exemplary flowgraph of the functions performed by instrumentation using bits RWMS as described with respect to FIG. 21. Such functions do not require that the bit assignments are stored in the locations shown in FIG. 21. The steps shown in FIG. 22 are performed with respect to a single memory location or a single variable of the original computer program 39. Some of these steps, as described below, may be performed iteratively for each of the monitored memory locations or variables.

Step 221 shows that at the beginning of each window, bit R is set to 1, bit W is set to 0, bit M is set to 0, and bit S is set to 0. Then, in step 222, for each read or partial read, bit R is set to 0. Step 223 is responsive to a write. In particular, if the current bit sequence RWMS is equal to 0000 (indicating state Read First 1703), then the current value within the memory location is buffered. As previously discussed, however, such buffering may be initiated automatically by the operating system and in such a case the write hook need not test the value of the current state to see if buffering is required. Then, the second byte is set equal to the logical OR of the second byte and the contents of the first byte after the first byte is shifted four bits to the right. This "shift-and-or" operation has the effect of OR'ing the R bit into the W bit (analogous to the way in which this can occur to implement the write hook for the state machine of FIG. 15, as discussed above), OR'ing the 1 bit into the M bit (thereby setting the M bit), and leaving the S bit unaffected. As shown in step 224, for each partial write, bit M is set to 1.

Step 225 is responsive to a system call that either modifies or potentially modifies the monitored address. In response to a system call, bits RWMS are queried to determine the current state. If RWMS=0000, then the current value of the monitored memory location is stored in the system-call trace file. If, however, RWMS=0010 or RWMS=00*1, indicating that the machine is in the A=Written After Read state 1705 or in the A=Read After System Call state 1707, then the temporarily buffered value (for example, the value buffered in step 223 or step 224) is stored in the system-call trace file. Additionally, bit R is set to 1, bit W is set to 0, bit M is set to 1, and bit S is set to 1.

Step 226 is performed at the end of each window. If RWMS=0000, then the current value of the monitored memory location is stored in the regular trace file. If RWMS=0010 or RWMS=00*1, then the temporarily buffered value is stored in the regular trace file. Additionally, bit R is set to 1, bit W is set to 0, bit M is set to 0, and bit S is set to 0.

Although this particular bit layout may use two bytes to store the R, W, M, and S bits, alternative layouts of these bits are possible, for example those which store these bits in a single byte or a half-byte. An advantage of using two bytes is that the read and write hooks can be made very fast, as discussed next. Alternative bit layouts may require additional instructions to pack and unpack the appropriate bits.

FIG. 23 illustrates an exemplary definition of global registers for the memory state control instrumentation 45, in an embodiment of the invention in which the computer program is executed on a SPARC processor. In particular, registers g2 (%g2) and g5 (%g5) may be used for temporary storage in support of state computations, and register g3 (%g3) may be used for temporary storage of address computations. Register g4 (%g4) stores a constant value which is used to aid in mapping a memory address to its associated state word as previously discussed. Registers g1 (%g1) and g6 (%g6) are not used by the instrumentation. Register g7 (%g7) then is used to store the current value of the software instruction counter. These register assignments are appropriate if the mapping from memory address to associated state is performed by splitting the address space into two segments as previously discussed. Different register assignments may be appropriate if a two-level bitvector, or another scheme, were used instead.

FIG. 24 illustrates the specific instrumented code representing memory state control instrumentation 45 that replaces original instructions of the original computer program 39, for an embodiment of the invention in which the computer program 39 is executed on a SPARC processor, using the registers as defined in FIG. 23. Note that FIG. 24 is meant to be illustrative of how SPARC instructions can be instrumented and is not a complete specification of instrumentation for all SPARC instructions. The instruction "1d [%rY], %rX" is an instruction to move the four-byte contents of register X to a memory location indicated by the address stored in register Y. The instrumented code shown is added to the original computer program to implement the appropriate step shown in FIG. 22. For example, bit R is set to zero by the instruction "stb %g0, [%rY+%g4]," in accordance with step 222 of FIG. 22, and the original instruction, a full-word read, is left intact.

The instruction "1dub [%rY], %rX" is an instruction to move the contents of the low-order byte in register X to the byte whose address is indicated by register Y. The instrumented code aligns the appropriate address, sets bit M, and leaves the original instruction intact. The instruction "st%rX, [%rY]" instructs to move to register X the four-byte contents of the four-byte memory word whose address is stored in register Y. The instruction "stb%rX, [%rY]" instructs to move the contents of the low-order byte in register X to the byte whose address is stored in register Y. One approach for the instrumentation for each of these instructions is indicated by the "instrumented code" and associated comments of FIG. 24. Although the example described above is specific to the instruction set of a SPARC workstation, one skilled in the art can readily apply such techniques to any CPU or associated operating system.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. A method for monitoring an execution of a computer program so that a portion of the execution may be replayed, the method comprising the steps of:

(A) segmenting the computer program into a plurality of segments;

(B) executing the computer program including the plurality of segments;

(C) during execution of the computer program, monitoring access of a memory location by the computer program to determine whether an accessed value of the memory location is a value to be stored; and (D) at an end of each of the plurality of segments executed during execution, storing the accessed value when step (C) determines that the accessed value includes a value to be stored.

2. The method of claim 1, further comprising the steps of:

receiving an input indicative of a selected one of the plurality of segments of the computer program to be replayed;

writing to the memory location the value stored in step (D) corresponding to the selected one of the plurality of segments; and replaying the selected one of the plurality of segments.

3. The method of claim 1 further comprising the step, performed prior to step (C), of associating a state with the memory location.

4. The method of claim 3, wherein;

step (C) includes the steps of:

detecting a type of access of the memory location; and modifying the state associated with the memory location depending upon the type of access; and step (D) includes a step of determining whether the accessed value of the memory location includes a value to be stored based upon the state associated with the variable, at the end of each of the plurality of segments.

5. The method of claim 4, wherein the step of modifying includes transitioning the state from a first state to a second state without performing a conditional test on the first state.

6. The method of claim 4, wherein:

the step of associating includes storing a state variable in a second memory location that has a predetermined offset from the memory location; and the step of modifying includes modifying the state variable stored in the second memory location.

7. The method of claim 1, further comprising the steps of:

detecting that a type of access of the memory location corresponds to a predetermined type of memory access; and in response to a predetermined type of memory access, storing the accessed value prior to an end of one of the plurality of segments.

8. The method of claim 7, wherein the step of detecting that the type of access of the memory location corresponds to a predetermined type of memory access includes detecting that the access includes a system call that modifies data stored in the memory location.

9. The method of claim 1, wherein the steps of the method are performed by instrumentation instructions added to the computer program, such instrumentation instructions being executed during the execution of the computer program.

10. An apparatus for monitoring an execution of a computer program so that a portion of the execution may be replayed, the apparatus comprising:

means for segmenting the computer program into a plurality of segments;

means for executing the computer program including the plurality of segments;

means for monitoring access of a memory location by the computer program, during execution of the computer program, to determine whether an accessed value of the memory location includes a value to be stored; and means for storing the accessed value in response to the means for monitoring determining that the accessed value includes a value to be stored, at an end of each of the plurality of segments executed during execution.

11. The apparatus of claim 10, further comprising:

means for receiving an input indicative of a selected one of the plurality of segments of the computer program to be replayed;

means for writing to the memory location the value stored by the means for storing corresponding to the selected one of the plurality of segments; and means for replaying the selected one of the plurality of segments.

12. The apparatus of claim 10, wherein the apparatus further comprises means for associating a state with the memory location; and wherein the means for monitoring includes:

means for detecting a type of access of the memory location; and means for modifying the state associated with the memory location depending upon the type of access; and wherein the means for storing includes means for determining whether the accessed value of the memory location includes a value to be stored based upon the state associated with the variable, at the end of each of the plurality of segments.

13. The apparatus of claim 12, wherein the predetermined plurality of access types includes a read, a write, a partial read, a partial write, and a system call.

14. The apparatus of claim 12, wherein the means for modifying includes means for transitioning the state from a first state to a second state without performing a conditional test on the first state.

15. The apparatus of claim 12, wherein:

the means for associating includes means for storing a state variable in a second memory location that has a predetermined offset from the memory location; and the means for modifying includes means for modifying the state variable stored in the second memory location.

16. The apparatus of claim 10, further comprising:

means for detecting that a type of access of the memory location corresponds to a predetermined type of memory access; and means, operative in response to the type of access of the memory location that is monitored corresponding to the predetermined type of memory access, for storing the accessed value prior to an end of one of the plurality of segments.

17. The apparatus of claim 16, wherein the means for detecting that the type of access of the memory location corresponds to a predetermined type of memory access includes means for detecting that the access includes a system call that modifies data stored in the memory location.

18. The apparatus of claim 10, wherein the apparatus includes instrumentation instructions added to the computer program, such instrumentation instructions being executed during the execution of the computer program.

* * * * *